US011336113B2

(12) United States Patent
Caamano et al.

(10) Patent No.: US 11,336,113 B2
(45) Date of Patent: May 17, 2022

(54) BACK-UP GENERATOR AND ASSOCIATED ELECTRIC POWER SYSTEMS

(71) Applicant: Blue Power Systems, Inc., Gilroy, CA (US)

(72) Inventors: Ramon A. Caamano, Gilroy, CA (US); Gregory P. Miller, Austin, TX (US)

(73) Assignee: Blue Power Systems, Inc., Gilroy, CA (US)

( * ) Notice: Subject to any disclaimer, the term of this patent is extended or adjusted under 35 U.S.C. 154(b) by 0 days.

(21) Appl. No.: 17/013,388

(22) Filed: Sep. 4, 2020

(65) Prior Publication Data
US 2021/0075252 A1 Mar. 11, 2021

Related U.S. Application Data

(60) Provisional application No. 62/896,956, filed on Sep. 6, 2019.

(51) Int. Cl.
*H02J 9/06* (2006.01)
*H02J 7/00* (2006.01)
*H02J 3/38* (2006.01)
*H02J 3/00* (2006.01)
(Continued)

(52) U.S. Cl.
CPC .......... *H02J 9/062* (2013.01); *F24D 17/0005* (2013.01); *H02J 3/004* (2020.01); *H02J 3/04* (2013.01); *H02J 3/381* (2013.01); *H02J 7/007* (2013.01); *H02J 2207/20* (2020.01); *H02J 2300/10* (2020.01); *H02J 2300/24* (2020.01); *H02J 2300/28* (2020.01)

(58) Field of Classification Search
CPC .... H02J 9/062; H02J 2300/10; H02J 2300/24; H02J 2300/28; H02J 3/04; H02J 3/381; H02J 7/007; H02J 2207/20; F24D 17/0005

USPC .......................................................... 307/20
See application file for complete search history.

(56) References Cited

U.S. PATENT DOCUMENTS

| 2012/0068541 A1 | 3/2012 | Anderson |
| 2013/0106173 A1 | 5/2013 | Nomura |
| 2013/0162037 A1 | 6/2013 | Kim et al. |

(Continued)

OTHER PUBLICATIONS

International Search Report and Written Opinion for International Application No. PCT/US2020/049519, Notification dated Jan. 19, 2021.

*Primary Examiner* — Hal Kaplan
(74) *Attorney, Agent, or Firm* — Knobbe Martens Olson & Bear, LLP

(57) ABSTRACT

An electric power system is disclosed herein. The electric power system may manage and store electric power and provide uninterrupted electric power, derived from a plurality of electric power sources, to an electric load. The electric power system may contain an energy storage unit and generator assembly. The electric power system may connect to a power grid and renewable energy sources, and may charge the energy storage unit using the power grid, renewable energy sources, and/or generator assembly. The electric power system may be configured to determine load power usage and environmental factors to automatically and continuously modify a charging protocol to, for example, provide high efficiency and/or self-sufficiency from the power grid. The electric power system may operate entirely off-grid and may provide electricity to the load without interruption to power.

14 Claims, 12 Drawing Sheets

(51) Int. Cl.
*F24D 17/00* (2022.01)
*H02J 3/04* (2006.01)

(56) References Cited

U.S. PATENT DOCUMENTS

2013/0169055 A1    7/2013   Bats et al.
2016/0049820 A1*   2/2016   Caamano ............... G06Q 10/10
                                                  307/82
2016/0329847 A1    11/2016  Mouni et al.

* cited by examiner

US 11,336,113 B2

BACK-UP GENERATOR AND ASSOCIATED ELECTRIC POWER SYSTEMS

PRIORITY CLAIM

This application claims priority to U.S. Patent Prov. App. 62/896,956, entitled "BACK-UP GENERATOR AND ASSOCIATED ELECTRIC POWER SYSTEMS" and filed on Sep. 6, 2019. This priority application is incorporated herein by reference in its entirety.

FIELD

The present disclosure relates to back-up generators and electric power systems that include a back-up generator.

BACKGROUND

For electricity in residential and commercial applications, connection to an electrical power grid maintained by a utility is typically required. While typically reliable, the supply of electricity from such power grids may occasionally be interrupted by, for example, maintenance, natural disasters (such as fires, hurricanes, snow storms, etc.), excessive demand (which may cause, for example, rolling blackouts), etc. Back-up generators powered by fuel, such as gasoline, have commonly been utilized to provide an alternate source of electricity when power from an electrical grid is not available. Such back-up generators, however, only provide a temporary solution and may be inefficient to operate, both from a cost and an environmental emissions standpoint. Systems and methods disclosed herein address various challenges related to back-up energy systems.

SUMMARY

In some implementations, an electric power system is provided for managing and storing electric power and providing uninterrupted electric power from a plurality of electric power sources to any electric loads connected to the electric power system.

In some implementations, the electric power system may be an off-grid system and the plurality of electric power sources may include one or more variable energy sources that are variable over time, such as devices that create electrical energy from sunlight, wind, or flowing water (for example, an array of photoelectric solar panels, a windmill, a small hydroelectric generator), or an electric energy storage system. The variable energy source may generate an alternating current (AC) power output at an output voltage and frequency. The variable energy source may be configured to detect an AC operating frequency associated with the electric power system and synchronize the AC power output frequency of the variable energy source to the detected AC operating frequency. The variable energy source may synchronize its AC output frequency with the electric power system operating frequency through the use of a grid-tied inverter. In some other implementations, the electric power system may be connected to the power grid as well as variable energy sources, but may be configured to prioritize drawing energy from the variable energy sources.

The electric power system may include a rechargeable electric energy storage pack having a storage pack direct current (DC) power input/output. The electric power system may also include a system inverter comprising a voltage transforming assembly for transforming the voltage of electrical power input to, and output from, the system inverter. The system inverter may have an inverter DC power input/output electrically connected to the storage pack DC power input/output for receiving and transmitting DC electric power to and from the rechargeable electric energy storage pack. The system inverter may also have an AC power input/output for electrically connecting the system inverter to the variable energy source to receive the AC power output of the variable energy source. The system inverter may also be configured to generate a desired AC operating frequency and voltage using DC power supplied by the rechargeable electric energy storage pack. This generated AC operating frequency and voltage information may be electrically communicated to the variable energy source through the inverter AC power input/output.

The electric power system may further include a generator assembly for generating an electric power output. The generator assembly may include a heat engine (for example, a fuel-powered combustion engine) connected to a high frequency generator, where the heat engine drives the high frequency generator. The high frequency generator may include a permanent magnet rotor. A generator controller may be electrically connected to the high frequency generator to control the operation of the high frequency generator and actively rectifying the electric power output of the high frequency generator to produce a DC power output from the generator arrangement. The DC power output of the generator arrangement may be electrically connected to the energy pack DC power input/output.

Electric loads that are powered by the electric power system may be electrically connected to the inverter AC input/outputs of the system inverter to provide electrical power to the electric loads. DC loads may also be connected to the inverter DC input/outputs of the system inverter.

The electric power system may be programmable to provide cost and energy efficiency, for example according to user standards or preferences. The electric power system may automatically adjust its charging protocol for the rechargeable electric energy storage pack, based at least in part on weather forecasts and energy costs. Users may also define preferred charging protocols, which may be manually activated or automatically switched on and off.

In some implementations, the electric power system comprises an electric battery, an inverter, a fuel-powered generator for generating alternating current electricity, and an active rectifier in electrical communication with the fuel-powered generator and the electric battery. The active rectifier may be configured to: receive the alternating current electricity from the fuel-powered generator; provide active rectification of the alternating current electricity; and output direct current electricity to the electric battery. The inverter may comprise an input in electrical communication with the electric battery; and an output for electrical communication with a load.

In some implementations, a method is provided for operating an electric power system. The method comprises providing an electric battery in electrical communication with one or more energy sources configured to convert a renewable energy source into electrical energy for charging the battery; determining energy sources available for charging the electric battery; determining categories of weather occurrences pre-classified as being relevant for the available energy sources; obtaining weather forecast information; and modifying a charging behavior of the system based on the weather forecast information. The operations may further comprise determining a consumption behavior of a load receiving electricity from the electric battery; determining whether a duration of a forecasted weather event is sufficient to impact the load based on the consumption behavior; and modifying the charging behavior of the system in response to determining that the duration of the forecasted weather event is sufficient to impact the load based on the consumption behavior.

DETAILED DESCRIPTION

Figure 1:
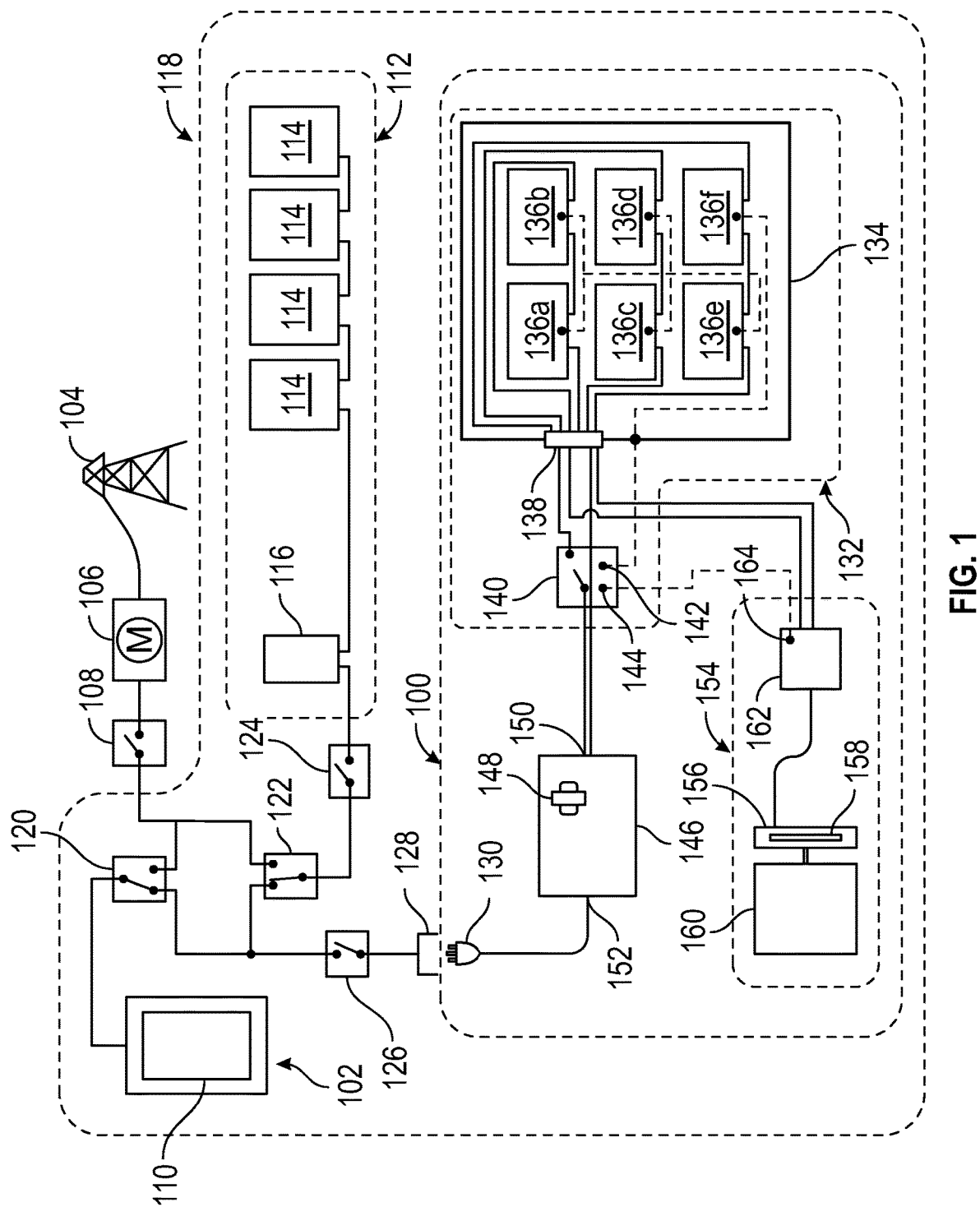
FIG. 1 is a schematic diagram of an example of an electric power system connected to various energy sources.

Modern energy efficiency systems allow users to cut electricity usage by harnessing the power of renewable resources, such as solar, wind, or water. However, power grid-tied renewable resources are typically required to automatically shut off when the grid goes down, and the many of these installations do not include any form of stored back-up power in case of a power outage. Undesirably, facilities attached to generators producing electricity from renewable resources may lose all power when the grid is down even if the renewable resources could potentially provide power during a power outage. Although there are some battery back-up systems that provide power back-up capabilities as well as the use and storage of power from renewable resources when the grid is down, these systems are not typically capable of providing prolonged use of the full amounts of power needed for common residential or commercial applications due to the high storage capacities required. As an alternative, fuel-powered generators may be used to power homes or commercial facilities. Undesirably, however, such generator-based systems may be too inefficient for long-term operation, too noisy for residential use, and/or too large for widespread application.

Advantageously, in some implementations, a fully integrated back-up power system may provide uninterrupted power for an indefinite period of time regardless of the amount of power available from a variable electrical energy source (such as a renewable energy source) or a power grid, while also highly efficiently using power available from the variable electrical energy source. The power system may include a generator assembly and an electric power storage assembly, which may include an energy storage pack such as a battery. The generator assembly may include a fuel-powered engine and one or more renewable energy sources to provide electrical energy which is stored in the energy storage pack. Power that is generated by the generator arrangement and that is not used by a load connected to the system may be routed to charge the energy storage pack. The energy storage pack allows for capture of over-generation of electricity and also for time-shifting of the electricity generation, which may have advantages for efficient and unobtrusive energy generation and for modulating energy usage and production to ensure long-term electrical power delivery from the power system even when not connected to the power grid.

In some implementations, the generator assembly may be run for significantly less time and at substantially more efficient rates than a typical back-up generator system without an energy storage assembly, since the generator would need to be run continuously when additional power was needed. The electric power system may be used entirely off-grid or be used to form a micro-grid that provides power to electric loads that are not normally tied to a main grid but have a main grid connection available. When connected to a main grid, the system may also charge its batteries from the grid. It will be appreciated that the electric power systems disclosed herein may be understood to be "back-up" systems in the sense that they may be utilized to provide an alternative source of electricity for a load, such as a home or commercial facility, which may also be connected to other power systems (e.g., an electric power grid maintained by an electric utility). In some implementations, the "back-up" system may be utilized as the primary source of electricity for the load and/or may be utilized as the only source of electricity for the load in applications in which the load is not connected to another source of electricity.

It will be appreciated that the electric power storage assembly may include a battery for storing electrical energy. The electric power system may produce alternating current (AC) power by converting direct current (DC) energy stored in a battery. This AC power is used to power electric loads connected to the system, or a micro-grid created by the system. Once the micro-grid is powered up, the variable energy source may detect the AC operating frequency and voltage of the electric power system. The variable energy source may synchronize its AC power output frequency and voltage with the operating frequency and voltage of the electric power system, allowing it to push the electric power generated by the variable energy source onto the micro-grid. In cases where the variable energy source produces more power than is needed to power the loads connected to the micro-grid, the electric power system may convert the excess power from AC to DC and allow it to flow to the battery. In cases where the variable energy source is not producing enough power to cover all of the loads connected to the micro-grid, power from the battery may be converted from DC to AC as it flows to the micro-grid to cover the power deficit. Thus, the electric power system may efficiently use the available variable energy power generation and store any excess power that is generated in the battery. The stored power is then available to loads on the micro-grid when there is insufficient power from the variable energy source. It will be appreciated that, as discussed herein, the variable energy source may be a renewable energy source, which may include structures for capturing solar energy (for example, using photovoltaic cells), wind energy (for example, using wind turbines), and/or the kinetic energy from moving water (for example, using hydroelectric turbines). It will be appreciated that these renewable energy sources may be considered variable energy sources in the sense that the amount of energy available from these sources may rise and fall depending on the occurrence of natural phenomena (for example, depending on the rising and setting of the sun in the case of solar radiation or wind, or the availability of ice melt or precipitation in the case of hydroelectric power).

In addition, as discussed herein, the electrical power system may be configured to efficiently and automatically provide continuous updating of charging protocols. It will be appreciated that, for example, weather events may alter the availability and the magnitude of energy generation by a renewable energy source. In some implementations, the electrical power system may be configured to modify the charging protocol for the energy storage pack depending upon the forecasted occurrence of particular weather events. In some implementations, the energy consumption behavior of a load (for example, a home) may be tracked over time to generate an energy consumption profile, which may be utilized to filter the types of and/or weight assigned to weather events to determine whether the weather event meets a threshold for modifying a charging protocol and how the protocol is modified. For example, a load or user that daily depletes the energy storage pack may require more frequent modification of the charging protocol and greater use of a fuel-powered engine as an alternative to the renewable energy source than a user that retains capacity a significant amount of charge in the energy storage pack each day. This latter energy consumption profile may naturally buffer against short-term changes in available renewable energy, such that only long-term weather events (for example, those expected to last two or more, or three more days) may be sufficient to cause modification of the charging protocol.

In some implementations, the generator assembly may include a fuel-powered engine and an active rectifier for providing active rectification for converting AC generated by the fuel-powered engine into DC for charging the energy storage pack. Preferably, the active rectifier accepts AC of a wide range of frequencies, which may be tied to the revolutions per minute (RPMs) of the fuel-powered engine. It will be appreciated that an engine operating at higher RPMs may be louder than an engine operating at lower RPMs. Consequently, active rectification of AC generated by the fuel-powered engine allows the noise level of the electrical power system to be regulated without impacting the compatibility of DC provided by the generator assembly for charging the energy storage pack. As a result, in some implementations, noise levels may be reduced during times when high levels are not acceptable (for example, at night in a residential neighborhood). In some implementations, both forecasted weather events and the time of day (and permitted noise thresholds) may be utilized to determine a modified charging protocol. For example, in anticipation of a weather event that may diminish available renewable energy sources, charging of the energy storage pack may occur with the fuel-powered engine running at high RPMs during the daytime and shifting to lower RPMs at nighttime, even if this would result in the renewable energy source being slightly less than full, as would occur if the fuel-powered engine ran at high RPMs throughout the night. As a result, the acceptability of the electrical power system in various environments may be expanded.

Advantageously, the electrical power system may be a compact, integrated unit which may occupy a form factor similar to a small utility trailer for easy transport and portability. There may be many advantages of providing a fully portable system that includes a fully integrated electric energy storage pack and back-up generator. For example, this may provide a complete, uninterruptable electrical power system that efficiently uses the power generated by the variable energy source and also provides indefinite back-up power to any home or site that has access to the grid and/or a renewable energy source. This system also allows the home or site to be operated fully off-grid if desired. Further, this system may be quickly deployed after a natural disaster. If deployed in quantity, such systems could provide a long-term solution that would not require the complete rebuilding of the main grid. This approach could also provide a decentralized power system that includes power storage, power management, and power generation. This type of decentralized system would also encourage the use of on-site variable energy sources such as solar and wind. Implemented on a large scale, this type of decentralized system could provide an overall electric power system that is more efficient compared to a conventional centralized power plant for a new community or a community that experienced a natural disaster. In addition, by taking into account the forecasted availability and magnitude of electrical generation from renewable energy sources, the use of a fuel-powered engine may be kept at a low-level, while extending the ability of the electrical power system to provide uninterrupted energy over long durations.

Example Power System Configurations

Reference will now be made to the drawings, in which like reference numerals refer to like parts throughout. Unless indicated otherwise, the drawings are schematic and not necessarily drawn to scale.

FIG. 1 is a schematic diagram of an example of an electric power system 100 in accordance with some aspects of the disclosure herein. The electric power system 100 may provide a system for managing and storing electric power and providing uninterrupted electric power from a plurality of electric power sources to an electric load 102 connected to the electric power system 100. The electric power system 100 may be an off-grid system, or may be connected to a main grid 104 through an electric meter 106 and a main grid disconnect switch 108 that allows the main grid 104 to be selectably connected to, and disconnected from, the overall system described herein. It will be appreciated that the main grid 104 may be maintained by an electrical utility company. The electric load 102 may be a domestic residence, a commercial building, or any other facility that requires electric power. For example, the electric load 102 may be a house with an electrical panel 110 including conventional circuit breakers and electrical circuits for providing conventional 240V and 120V AC electrical power throughout the house. It will be appreciated that the various lines illustrated as connecting the various features in FIG. 1, and other figures herein, indicate electrical communication between those features; that is, the various lines may provide a conduit for current flow between the features.

The electric power system 100 may be connected to a plurality of electric power sources, including the main grid 104 and various renewable energy sources. For example, the electric power system 100 may be connected to a photo-electric solar panel array 112. The solar panel array 112 may include one or more solar panels 114 that are electrically connected to a grid-tied inverter 116. Although inverter 116 is described as a grid-tied inverter, it will be understood that inverter 116 may not be connected to the main grid 104 in some implementations. Instead, the grid-tied inverter 116 may be used to electrically connect the solar panel array 112 to the electric power system 100 to create a micro-grid 118 that may or may not be connected to the main grid 104.

It will be understood that any suitable and readily providable solar array system and any suitable and readily providable grid-tied inverter may be used with the system described herein. For example, the solar array system may include solar panels that are daisy chained together with their DC output connected to a large grid-tied inverter. However, this may require a high amperage DC line to be run from the solar panel array to the inverter, which may lead to expensive wiring requirements for longer distances. Alternatively, multiple smaller inverters may be mounted on multiple panels and a much lower amperage 240 VAC line may be run to connect the multiple smaller inverters to the electrical panel 110 and micro-grid system.

It will be appreciated that, in other implementations, the grid-tied inverter 116 may also be connected to additional renewable energy sources, or the structure 112 may be understood to be a renewable energy source other than an array of solar panels. For example, in some implementations, the structure 112 may be understood to be or to include one or more of wind turbines, water turbines, and the like as an alternative to or in addition to solar panels.

The grid-tied inverter 116 may be configured to generate an AC power output from the renewable energy sources at an output voltage and frequency based on an AC voltage and frequency that the grid-tied inverter 116 detects from the system to which it is connected. For example, when the grid-tied inverter 116 is not electrically connected to the main grid 104 through the main grid disconnect switch 108, the grid-tied inverter 116 may detect an AC operating frequency and voltage associated with the electric power system 100. The grid-tied inverter 116 may then automatically synchronize the frequency of the AC power output of the grid-tied inverter 116 with the detected AC operating frequency of the electric power system 100.

The electric power system 100 may be disconnected and/or reconnected to the electrical load 102 and renewable energy source 112. For example, a load transfer switch 120 may allow the electrical load 102 to be alternatively connected to either the main grid 104 or the electric power system 100. A renewable energy transfer switch 122 may allow renewable energy source 112 to be alternatively connected to either the main grid 104 or the electric power system 100. The load transfer switch 120 and renewable energy transfer switch 122 may both be electronically controllable transfer switches controlled by the electric power system 100. Further details of some switch configurations are described herein in relation to FIGS. 7A-7C.

A renewable energy disconnect switch 124 and a power system disconnect switch 126 may allow the renewable energy source 112 and electrical power system 100 to easily be connected to and disconnected from other parts of the overall system. The renewable energy disconnect switch 124 may be placed between the renewable energy source 112 and renewable energy transfer switch 122 so the renewable energy source 112 may be selectably electrically connected to, and disconnected from, the overall system. The power system disconnect switch 126 may be placed between the electrical power system 100 and main grid 104 to allow the electric power system 100 to be selectably electrically connected to, and disconnected from, the main grid 104. The power system disconnect switch 126 may be any disconnect switch.

In some implementations, the electric power system 100 may also be readily disconnected from the overall system through a plug and receptacle assembly. In some implementations, the premises of the electric load 102 may contain a 240V receptacle 128 and the electric power system 100 may have a suitable mating 240V plug 130. Other configurations supporting different voltages may also be feasible. Plug 130 may allow for easy electrical installation of electric power system 100. The plug and receptacle assembly may also allow the electric power system 100 to be a fully portable system that may be quickly and easily deployed, swapped out, or relocated when desired by simply plugging in, or unplugging, the electric power system 100.

The electric power system 100 may further include a rechargeable electric energy storage pack 132. In some implementations, the electric energy storage pack 132 may be a battery 134, such as a lithium ion battery, and may include a plurality of battery modules such as battery modules 136*a-f*. In some other implementations, the storage pack 132 may comprise other types of batteries, including one or more of aluminum-ion, carbon, flow, lead-acid, etc. In yet other implementations, the storage pack 132 may comprise flywheels, capacitors, or any other suitable electric energy storage device. It will be appreciated that the battery 134 may also comprise fewer or more battery modules than illustrated in FIG. 1. The electric energy storage pack 132 may also include a battery DC power input/output bus 138 and a pack management control unit 140. The pack management control unit 140 may be a control area network (CAN) controller that includes two CAN BUS nodes 142 and 144. The pack management control unit 140 may provide an electronically controlled disconnect switch for controllably disconnecting the battery 134 from the rest of the electric power system 100.

The battery modules 136*a-f* may be connected in series or in parallel, depending on the desired nominal voltage. The battery modules 136*a-f* may be connected to the battery DC power input/output bus 138. The total electrical energy storage capacity of battery 134 may be calculated by summing up the energy storage capacity of each individual battery modules 136*a-f*. The operating voltage of the battery may vary from the nominal voltage, depending on the state of charge of the battery cells. For example, a 48 V battery may experience a voltage operating range that varies from about 36 VDC to about 51 VDC. The operating voltage of the battery may be used to determine the amount of power available in the pack.

Each battery module 136*a-f* may include a battery module controller for monitoring and managing each of the battery cells making up each battery module. Each battery module controller may also be connected to pack management control unit 140 through CAN BUS node 142. This may allow the battery module controllers and pack management controller 140 to communicate status and control information to manage and control the operation of the rechargeable electric energy storage pack 132. The system may also be configured to provide information on the status of the battery modules and cells and the pack management controller to a user interface. Each battery module 136*a-f* may further include a heating/cooling loop that makes contact with each battery cell in the associated module. This allows the system to be configured to control the temperature of all of the battery cells making up the battery modules.

The electric power system 100 may further include a system inverter 146 with a voltage transformer 148 for transforming the voltage of electrical power input to, and output from, the system inverter 146. The system inverter 146 may have a bi-directional DC power input/output 150 that is electrically connected to the battery DC power input/output bus 138 through the pack management control unit 140 for receiving and transmitting DC electric power to and from the rechargeable electric energy storage pack 132. The system inverter 146 may also have a bi-directional AC power input/output 152 for electrically connecting the system inverter 146 to the AC power output of grid-tied inverter 116 of the renewable energy source 112 and to the electric load 102. The bi-directional AC power input/output 152 is configured to receive the AC power output of the grid-tied inverter 116. Also, the system inverter 146 may be configured to generate a desired AC operating frequency and voltage using DC power supplied by the rechargeable electric energy storage pack 132 and electrically communicate this generated AC operating frequency and voltage to the grid-tied inverter 116 through the bi-directional AC power input/output 152. The system inverter 126 may provide a frequency shift between 60 Hz and 62.5 Hz for the AC output from the inverter. Although the present disclosure focuses on AC electric loads, it will be understood that DC loads may also be connected to the bi-directional DC input/output of the system inverter 146 to provide DC power to DC electric loads.

The electric power system 100 may include a generator assembly 154 having a heat engine 160 connected to and configured to drive a high frequency generator 156. The high frequency generator 156 may have a permanent magnet rotor 158, which may function as the flywheel for the heat engine 160. The high frequency generator 156 may also function as the starter and alternator for the engine 160, thereby eliminating the need for these components and reducing hardware space. In some implementations, the high frequency generator 156 may be a modified integrated starter alternator (ISA).

A generator controller 162 may be electrically connected to the high frequency generator 156 for controlling the operation of high frequency generator 156 and actively rectifying the electric power output of the high frequency generator 156 to produce a DC power output. The generator controller 162 may control the high frequency generator 156 to act as a starter motor for starting the heat engine 160 and as a controllable generator for generating a DC power output. The generator controller 162 may also function as an active rectifier, making the system more efficient than conventional generator systems that use passive rectification. The generator controller 162 may further include variable throttle control to provide various efficiency modes. It will be appreciated that the heat engine 160 may operate at different efficiencies at different RPMs. In some implementations, the generator controller 162 may be configured to default to controlling the heat engine 162 to operate at an RPM at which the heat engine is highly or most efficient (for example, at an RPM at which it most efficiently converts fuel into kinetic energy in the form of RPMs). For example, the generator controller 162 (for example, in response to a user input, or automatically as part of a charging protocol) may set the throttle control such that the generator runs at a low-to-moderate RPM to efficiently charge the battery 134. Alternatively, the user may set a higher RPM, where the generator 156 may not be as efficient but may charge the battery 134 at a faster rate (for example, to fully charge the battery 134 in preparation for a forecasted weather event and/or before limits on noise levels are lowered, such as at night). Advantageously, the ability to operate at different RPMs also facilitates the use of a wide range of heat engines 160, thereby allowing simple retrofitting of different heat engines (for example, for repair and/or to change power output requirements in response to long-term changes in the expected load).

Because the high frequency generator 154 may operate at a much higher frequency (for example, 300 Hz or more, or 400 Hz or more) compared to a conventional 60 Hz back-up generator system, the high frequency generator 156 may be much smaller than a conventional 60 Hz generator with the same power rating. This may allow the overall generator assembly 154 to be much smaller, lighter weight, and less costly than a conventional 60 Hz generator system. It will be appreciated that higher frequencies may be correlated with higher RPMs from the heat engine 160. In some implementations, the frequency output of the generator 156 may be configured to operate in a wide range of frequencies and heat engine RPMs, which may have advantages for noise regulation, as discussed herein. In some implementations, the voltage output ranges from about 28.5V to 162.2V as the speed of the heat engine varies from about 1000 to 6000 RPM with a voltage output of about 85.9V at 3000 RPM.

The generator controller 162 may include a CAN BUS connection 164 for connecting the generator controller 162 to the pack management control unit 140 through the CAN BUS node 144. This allows the generator controller 162 and pack management controller 140 to communicate status and control information in order to manage and control the operation of the generator assembly 154. The system may also be configured to provide information on the status of the generator assembly 154 and the pack management controller 140 to a user interface.

Because active rectification allows the generator assembly 154 to directly output DC power, the generator assembly 154 may be electrically connected to the battery DC power input/output bus 138 of the battery 134. The DC power output from the generator assembly may thus flow directly to the battery 134 and is not converted to AC. The generator assembly 154 may not be directly connected to the AC loads associated with the micro-grid as would be the case for a conventional 60 Hz AC back-up generator. This may allow the system to be more efficient at charging the battery 134 since the power going into the battery 134 does not need to be converted from AC to DC. Further, because the generator 156 need not match the power demands of the load 102, the generator 156 may run at its highest efficiency at any given time regardless of load demands, unlike traditional generators. In a sense, because power to the load 102 is provided by the battery 134, the battery 134 advantageously functions as a buffer, which allows the operation of the generator 156 to be set at a highly efficient level (for example, the generator 156 may be set to operate at its most efficient RPM setting) to charge the battery 134, while the battery provides the requisite power to the load 102. When the generator assembly 154 is running, only the power being used by the electric load 102 may flow through the system inverter 146 and be converted from DC to AC power. Any excess power generated by the generator assembly 154 may recharge the battery 134.

DC coupling between the generator assembly 154 and the battery 134 may also allow the system to continuously operate and provide uninterrupted power to the load 102 without requiring transfer switching when using the generator 156. Instead, the generator 156 may be turned on and off as desired with no switching or reconfiguration of the system. Another advantage of DC coupling the generator assembly 154 and the battery 134 is that the charge rate may not be limited by the system inverter size 146, since power flows directly from the generator assembly 154 to the battery 134.

Example Energy Storage Power Flow

Figure 2:
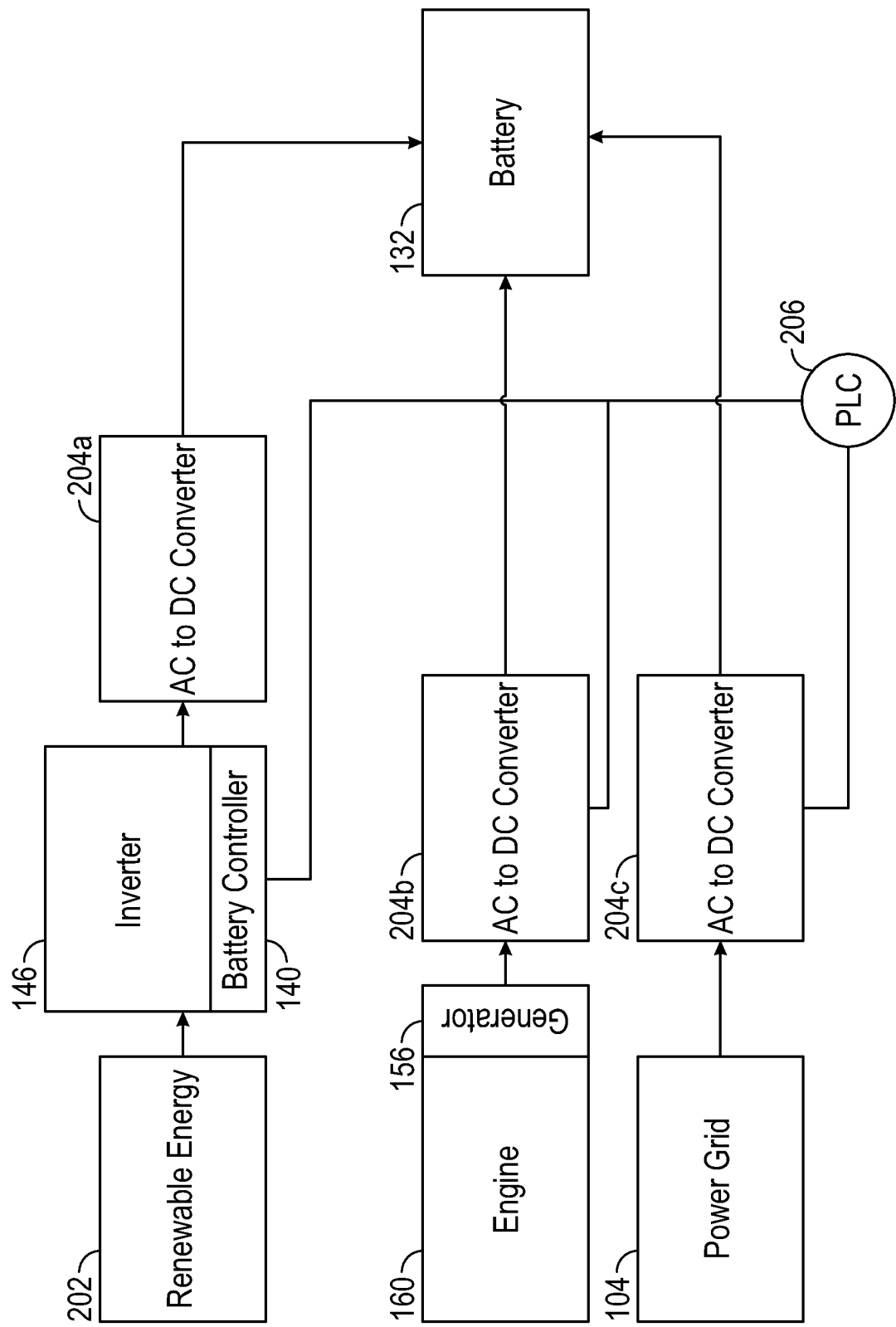
FIG. 2 is a schematic diagram illustrating an example of power flow from various energy sources to an energy storage pack within an electric power system.

FIG. 2 is a schematic diagram illustrating an example of power flow from various energy sources to the electric energy storage pack 132. The energy storage pack 132 may be charged by any combination of renewable energy source 202, a generator assembly comprising an engine 160 and generator 156, and the main grid 104. Energy from all of these sources may be stored into the energy storage pack 132 as DC power.

Renewable energy source 202 may derive energy from a solar panel array, wind turbine, water turbine, or any other renewable energy technology. In some implementations, the renewable energy source 202 may correspond to the renewable energy source 112 of FIG. 1. AC power output from the renewable energy source 202 may be directed through the system inverter 146 and AC to DC converter 204a. In some implementations, the inverter 146 is a separate device from the AC to DC converter 204a. In some other implementations, the inverter 146 and the AC to DC converter 204a may be combined into a single unit such that the power enters the inverter 146 as AC power and exits the inverter 146 as DC power. Likewise, the battery controller 140 may be part of the inverter 146 or may be a separate device.

The heat engine 160 and high frequency generator 156, in combination with an AC to DC converter 204b, form the generator assembly 154 described herein. Power from the generator 156 may flow through the AC to DC converter 204b to charge the storage pack 132. In some implementations, the high-frequency generator 156 is a separate device from the AC to DC converter 204b. In some other implementations, the generator 156 and the AC to DC converter 204b may be combined into a single unit such that the power leaves the generator 156 as DC power. Likewise, the engine 160 and high-frequency generator 156 may be assembled as one unit or as separate devices. As described herein, the system may more efficiently charge the storage pack 132 with an integrated generator assembly 154 because it does not need to convert the power from AC to DC, thus allowing the generator assembly 154 to be directly connected to the storage pack 132.

With continued reference to FIG. 2, power from the main grid 104 may flow through an AC to DC converter 204c to charge the storage pack 132.

In some implementations, the AC to DC converters 204a, 204b, 204c may all be the same device configured to receive different inputs. In some other implementations, the AC to DC converters 204a, 204b, 204c may be different devices. For example, the renewable energy AC to DC converter 204a may be part of a transformer, the generator assembly AC to DC converter 204b may be part of a motor controller, and the power grid AC to DC converter 204c may be part of a battery charger.

A programmable logic controller 206 may control selection of which energy source (202, 160, or 104) provides electricity to charge the storage pack 132. The logic controller 206 may communicate with the battery controller 140 and AC to DC converters 204b, 204c to activate or deactivate an energy source. The first step of the energy source selection process may begin with the battery, since charging only takes place when the battery is not full. Further, because the electric power system 100 prioritizes renewable energy, the storage pack 132 may communicate first with the battery controller 140. The battery controller may then activate or deactivate the inverter 146 and transmit the battery information to the logic controller 206 through CAN messaging. Depending on user defined settings, the logic controller 206 may also provide CAN commands to the AC to DC converters 204b, 204c. For example, in configurations in which the engine 160 is connected to a motor controller, the logic controller 206 may command the motor controller to start or stop the engine 160, or to reduce or increase RPMs. In configurations in which the grid 104 is connected to a battery charger, the logic controller 206 may command the battery chargers to begin or stop charging. Further details of how the logic controller 206 selects which energy sources to prioritize is discussed in relation to FIGS. 4 and 5.

To prevent overcharging of the storage pack 132, the system may be configured to have a high voltage cutoff for charging the storage pack 132 at a desired voltage. The cutoff for charging of the battery pack may be controlled by the CAN controller described herein. The CAN controller may be programmed with various battery charging cutoff voltages that may be used to disconnect the battery pack from the system as desired for various situations. The controller may also use information and inputs provided by a user interface to control the connection of the storage pack 132 to the system.

The system may also be configured with other methods to prevent overcharging of the storage pack 132 without disconnecting the battery. The system inverter 146 may allow the electric power system 100 to switch between generating AC power at 60 Hz and 62.5 Hz. This feature may be used to cause the renewable energy source 202 to stop providing energy into the micro-grid. When the system switches from generating AC power at 60 Hz frequency to 62.5 Hz frequency, the renewable energy generators (for example, the renewable energy source 202 and/or inverter 146) may automatically stop putting power onto the micro-grid. Renewable energy generators may automatically stop putting power onto the micro-grid because the 62.5 Hz frequency lies outside of the allowable frequencies that a compliant grid-tied device is allowed to put power onto its associated grid. Loads on the micro-grid may then be powered by the storage pack 132.

Alternatively, or in addition, the system may transfer the connection of the renewable energy 202 from the micro-grid to the main grid 104 by switching the renewable energy transfer switch 122 (FIG. 1) when the battery charge reaches a predetermined level. Once the storage pack 132 has been drawn down to a predetermined level, the connection of the renewable energy 202 could be transferred back to the micro-grid in a similar manner. Further description of how the load 102, renewable energy 202, main grid 104, and electric power system 100 may be be connected is discussed in relation to FIGS. 7A-7C.

Although FIG. 2 only shows one block for each component in the energy storage pack charging schematic, it will be appreciated that there may be multiple devices forming each component. For example, there may be one or more battery chargers, one or more renewable energy sources, one or more inverters, etc.

Example Charging Protocol Modification Procedures

Figure 3:
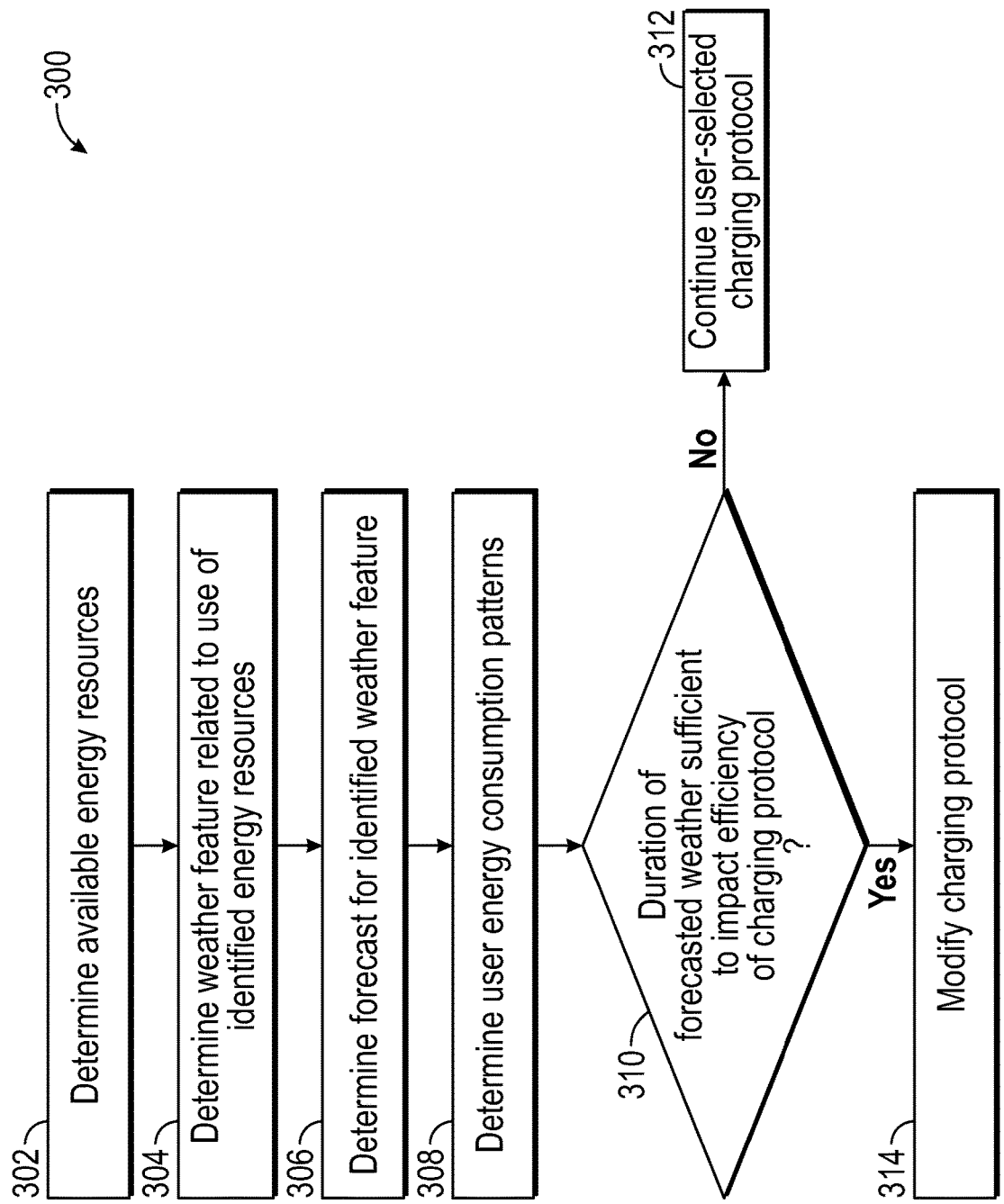
FIG. 3 is a process flow diagram of an example of a method for modifying energy storage cell charging procedures based on forecasted weather.

FIG. 3 is a flow diagram 300 of an example of a method for modifying energy storage pack charging procedures based on forecasted weather. The method begins at block 302, where the electric power system 100 may determine what types of energy resources are available. The system may detect all renewable energy sources 202 connected to the system 100 (FIG. 1).

At block 304, the system may determine which weather features have been predetermined to be appropriate for, or related to, the identified renewable energy sources. For example, if the system detects connected solar panels, the system could then identify sunniness (or cloudiness) as a related weather feature. Similarly, if the system detects connected water turbines, the system may identify rain or drought as related weather features.

At block 306, the system may determine forecasts for the identified weather features. The system may be part of a local area network or network connected to an external network such as the World Wide Web through which the system may obtain weather forecast information. For example, the system may utilize telemetry and/or supervisory control and data acquisition (SCADA) via a cellular modem. The system may also be connected to an application on a user device which allows the system to access the World Wide Web. The system may analyze forecasts of varying durations, based on the identified weather features. For example, for predicting wind turbine power generation, the system need only analyze the wind forecast for the following few days. However, for predicting water turbine power generation, the system may analyze the rain forecast for several weeks or months to determine whether there is a drought and whether the water turbine is an actual power source.

At block 308, the system may determine user or facility energy consumption patterns to determine a user consumption profile. The system may track the energy usage of a connected electric load to identify trends in the usage. For example, the system may track energy consumption over days, weeks, months, or years to arrive at the consumption profile. In some implementations, the consumption profile may include the amount of power used, the timing of power usage, etc.

At decision block 310, the system may determine whether the duration of the forecasted weather is sufficient to impact the efficiency of the current user-selected charging protocol. If not, the process may continue to block 312, in which the system does not change any charging behavior. For example, it may continue to follow the previously-defined default protocol.

If the forecast does predict weather events that may inhibit the efficiency of the current charging protocol, the process may continue to block 314, in which the system switches to a different charging protocol. For example, if the forecast predicts cloudy weather the entire next day and the facility only has solar panels, the system may charge the energy storage pack 132 at night with grid power when electricity costs are lower. This way, when electricity rates rise during the day, the user may use the stored power obtained at the lower price instead of paying the higher electricity rate. The system may also choose a new charging protocol based on whether the user pre-selected more cost-efficient protocols (see FIG. 4) or more energy efficient protocols (see FIG. 5).

Figure 4:
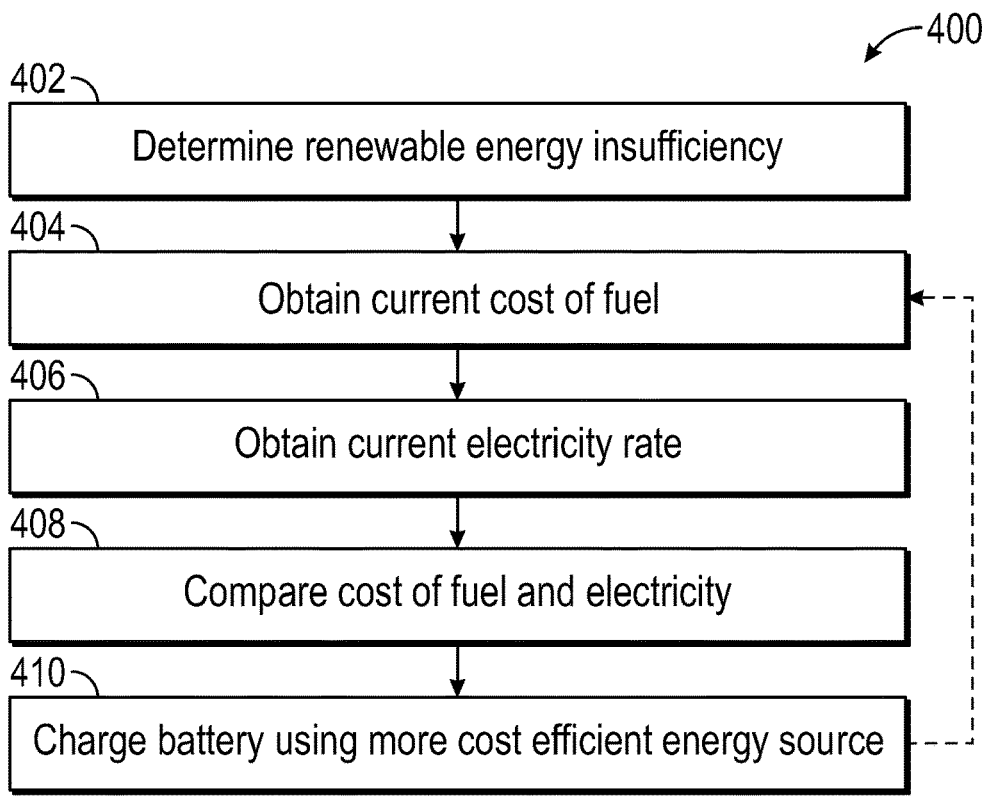
FIG. 4 is a process flow diagram of an example of a method for selecting a cost-efficient energy source from which to charge an energy storage pack.

FIG. 4 is a flow diagram 400 of an example of a method for selecting a cost-efficient energy source from which to charge an energy storage cell. The process begins at block 402, where the electric power system 100 may determine that connected renewable energy source options are insufficient for load demands. The determination may be present or future. For example, a house may currently be consuming 3 kWh of energy each hour, but renewable energy generators are only producing 2 kWh of energy each hour. As another example, using the method described herein, the system may analyze weather forecasts and electric load energy consumption trends, and determine that the renewable energy generators are likely to have lowered energy production during the load's usual peak energy use hours.

At block 404, the system may obtain the current price of fuel. The system may also determine the rate at which the generator 156 uses fuel. The system may thus determine the cost of using fuel to generate power for a given period of time.

At block 406, the system may obtain the current rate for receiving electricity from the power grid 104 (FIG. 3). As with the weather forecast described in FIG. 3, the system may obtain fuel and electricity costs through a network connection.

At block 408, the system may compare the cost of using fuel versus the cost of pulling energy from the main grid 104 to charge the storage pack 132.

At block 410, the system may charge the energy storage pack 132 using the lower cost energy source. For example, if electricity is $0.04/kWh between 8 PM and 8 AM but $0.15/kWh from 8 AM to 8 PM, and running the generator 156 using diesel costs $0.10/hr, the system will charge the storage pack 132, if necessary, using the power grid from 8 PM to 8 AM and using the generator 156 from 8 AM to 8 PM. The system may automatically repeat steps 404 to 410 continuously or at regular intervals until the user manually overrides the charging protocol or the system determines that there is sufficient renewable energy.

Figure 5:
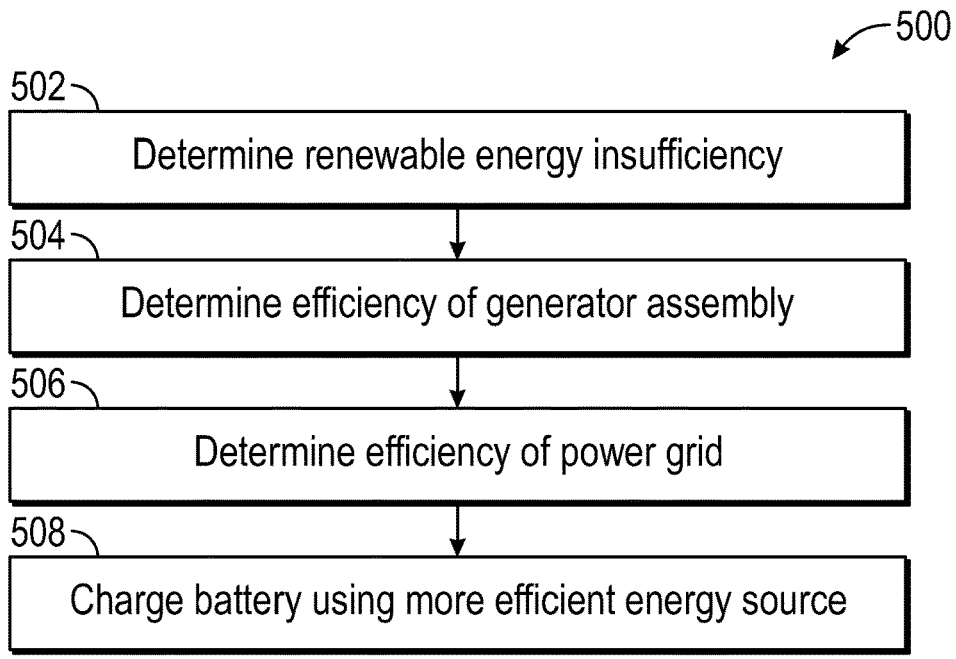
FIG. 5 is a process flow diagram of an example of a method for selecting an energy efficient energy source from which to charge an energy storage pack.

FIG. 5 is a flow diagram 500 of an example of a protocol for selecting an energy efficient energy source from which to charge an energy storage cell. The process begins at block 502, where the electric power system 100 may determine that connected renewable energy options are insufficient for load demands. The determination may be made in the same manner as described in FIG. 4.

At block 504, the system may determine the efficiency of the generator assembly 154. The system may use a standard accepted efficiency for generators. Alternatively, or in addition, the system may determine this efficiency based on the model the of generator assembly parts and the age of the generator assembly. Alternatively, or in addition, the system may determine the efficiency of the generator assembly 154 by, for example, tracking how much fuel is used over a period of the assembly's use.

At block 506, the system may determine the efficiency of using electricity from the main grid 104. In some implementations, the efficiency of the grid may be determined by calculating a weighted average of the renewable source efficiency and non-renewable source efficiency. The proportions may vary based on region, and the system may use its network connection to obtain grid energy information for its region. For example, California's grid power is ⅓ renewable and ⅔ non-renewable (for example, generated by thermal power plants). If the renewable energy is 83% efficient and the non-renewable energy is only 38% efficient, the weighted average would be a total grid efficiency of 53%.

At block 508, the system may charge the energy storage pack 132 using the more energy efficient source.

Figure 6:
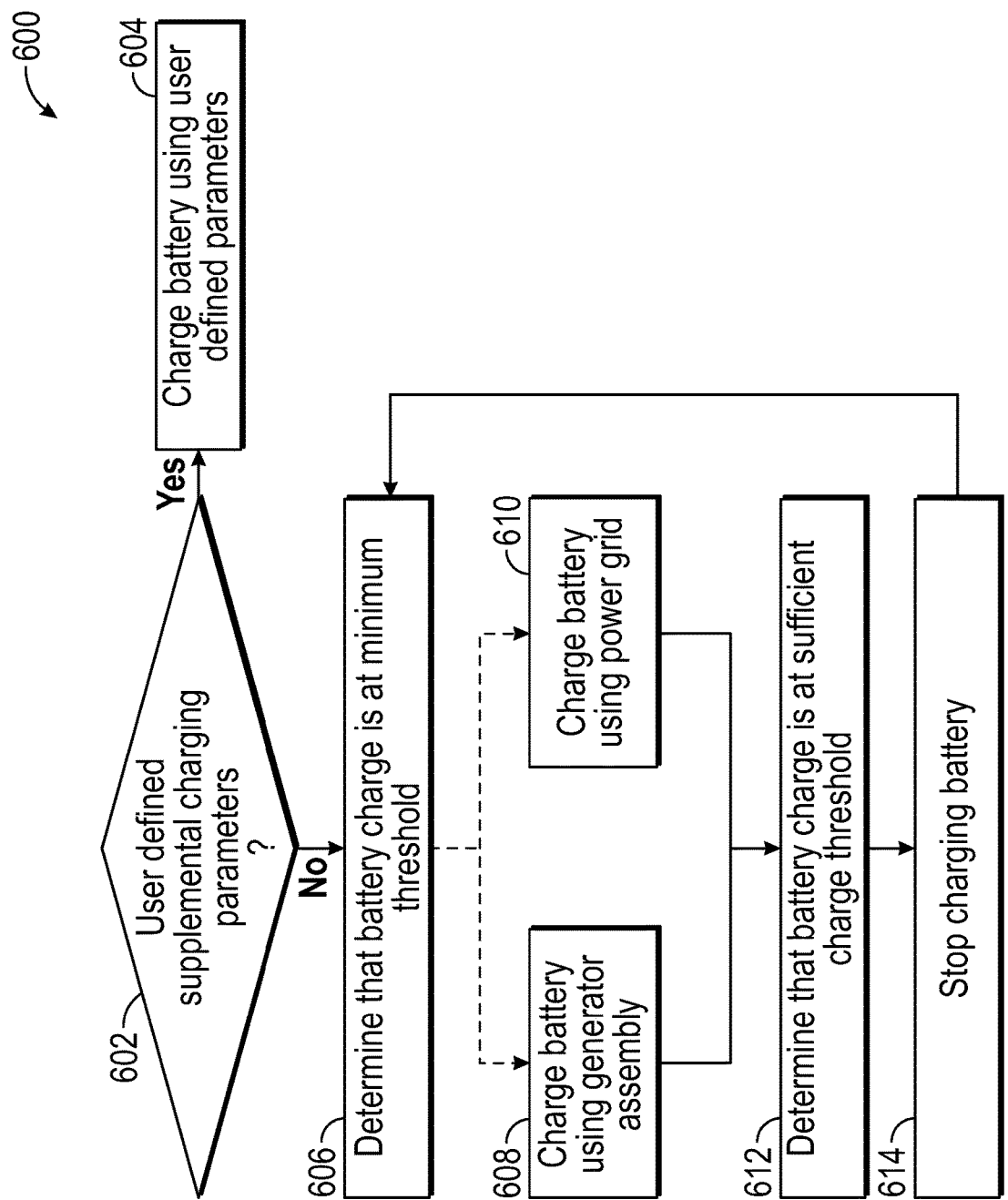
FIG. 6 is a process flow diagram of an example of a method for maintaining a minimum level of charge in an energy storage pack.

FIG. 6 is a process flow diagram 600 of an example of a method for maintaining a minimum level of charge in an energy storage cell. The process may prevent the storage pack 132 from being completely depleted. The process begins at block 602, where the system determines whether the user has previously defined parameters for supplemental charging. Supplemental charging may occur when the storage pack 132 is running low on stored energy and needs to be charged to avoid completely depleting the battery, since voltage of the battery pack is reduced as the battery pack discharges. If so, the process continues to block 604 and the system charges the storage pack 132 according to the user selected supplemental charging protocol. If the user did not set supplemental charging parameters, the process continues to block 606.

At block 606, the system may determine that the storage pack 132 has reached the minimum charge threshold. The system may have a default minimum threshold which triggers supplemental charging when the storage pack charge level drops to the threshold point. The default minimum threshold may be overridden by user manual input.

At optional block 608, the system may begin charging the storage pack 132, for example, using the generator assembly 154 (FIG. 1). The pack management controller 140 (FIG. 1) may be programmed to use the CAN BUS connection 164 to the generator controller 162 to instruct the generator controller 162 to start the generator assembly 154 when the battery voltage drops to the minimum threshold. Block 608 may be replaced by block 610, depending on user efficiency selection, as detailed herein.

At optional block 610, the system may begin charging the storage pack 132 using the main grid 104. Block 608 may be replaced by block 608, depending on user efficiency selection, as detailed herein.

At block 612, the system may determine that the storage pack charge has reached a sufficient charge threshold. At block 614, the system may stop charging the storage pack 132 (FIG. 1). The pack management controller 140 may be programmed to instruct the generator controller 162 to turn off the generator 156 when the battery voltage reaches the sufficient charge threshold.

The system may stop charging at the sufficient charge threshold instead of charging the storage pack 132 to maximum capacity in order to maximize use of renewable energy. For example, an electric power system 100 connected to only a solar panel may have low charge at night but may nonetheless have a low threshold such that the storage pack 132 is mostly empty when the sun rises. In such a scenario, it would be more cost and energy efficient fill the storage pack 132 with renewable energy rather than grid or generator power.

The minimum threshold and sufficient charge threshold may vary depending upon situation and may be adjusted based on information inputs through the user interface or other information inputs such as temperature sensors, time of day, day of the year, weather forecast information, etc.

Power System Connections

Figure 7A:
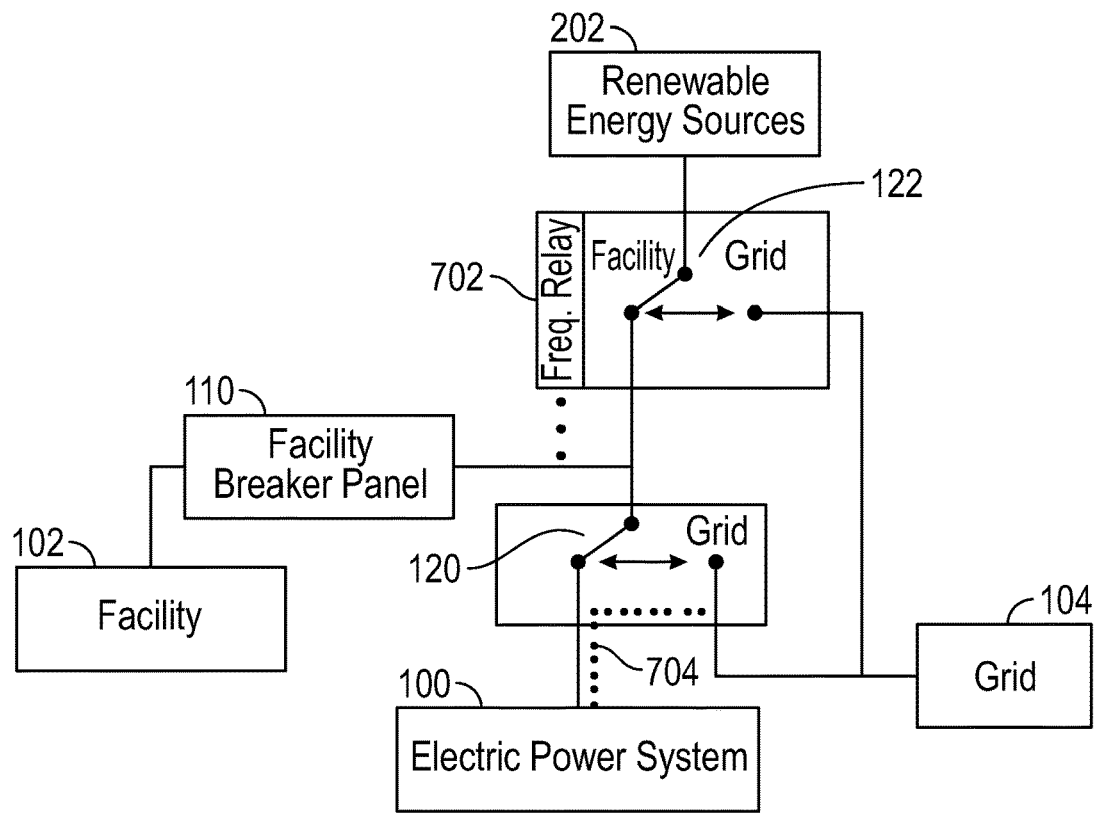
FIGS. 7A-C are block diagrams of examples of possible connection configurations between an electric load and various energy sources, including an electric power system.
Figure 7B:
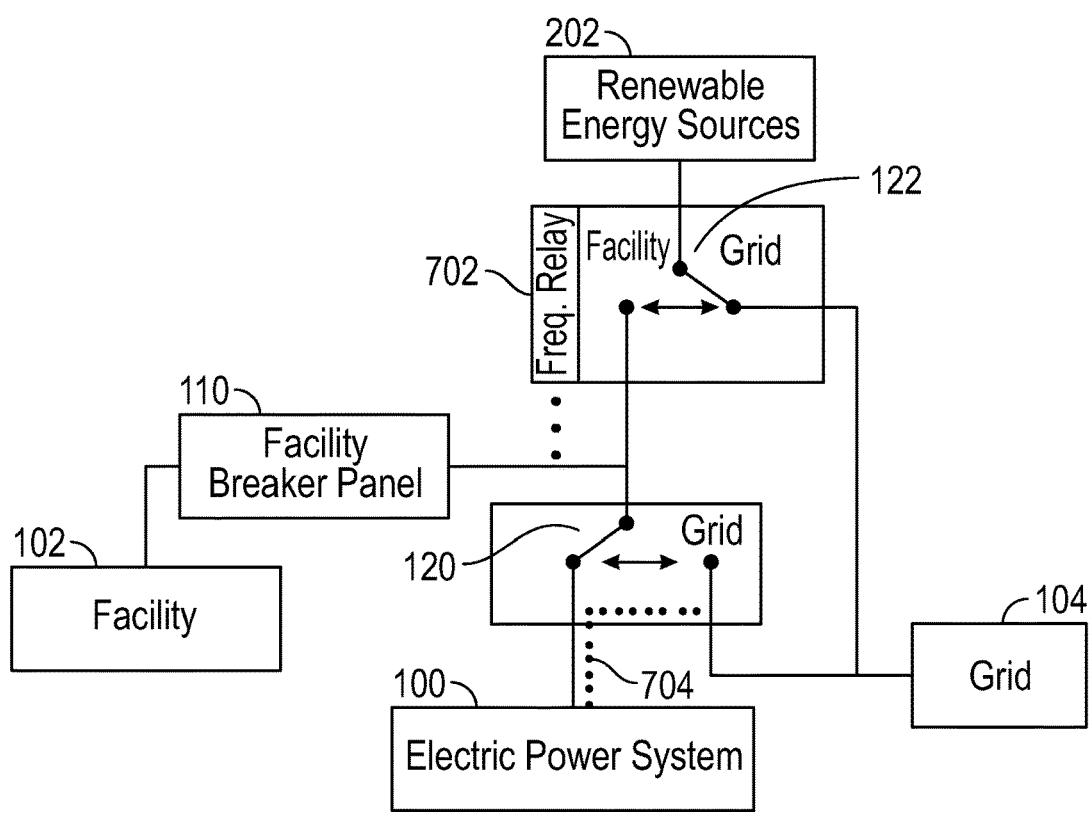
Figure 7C:
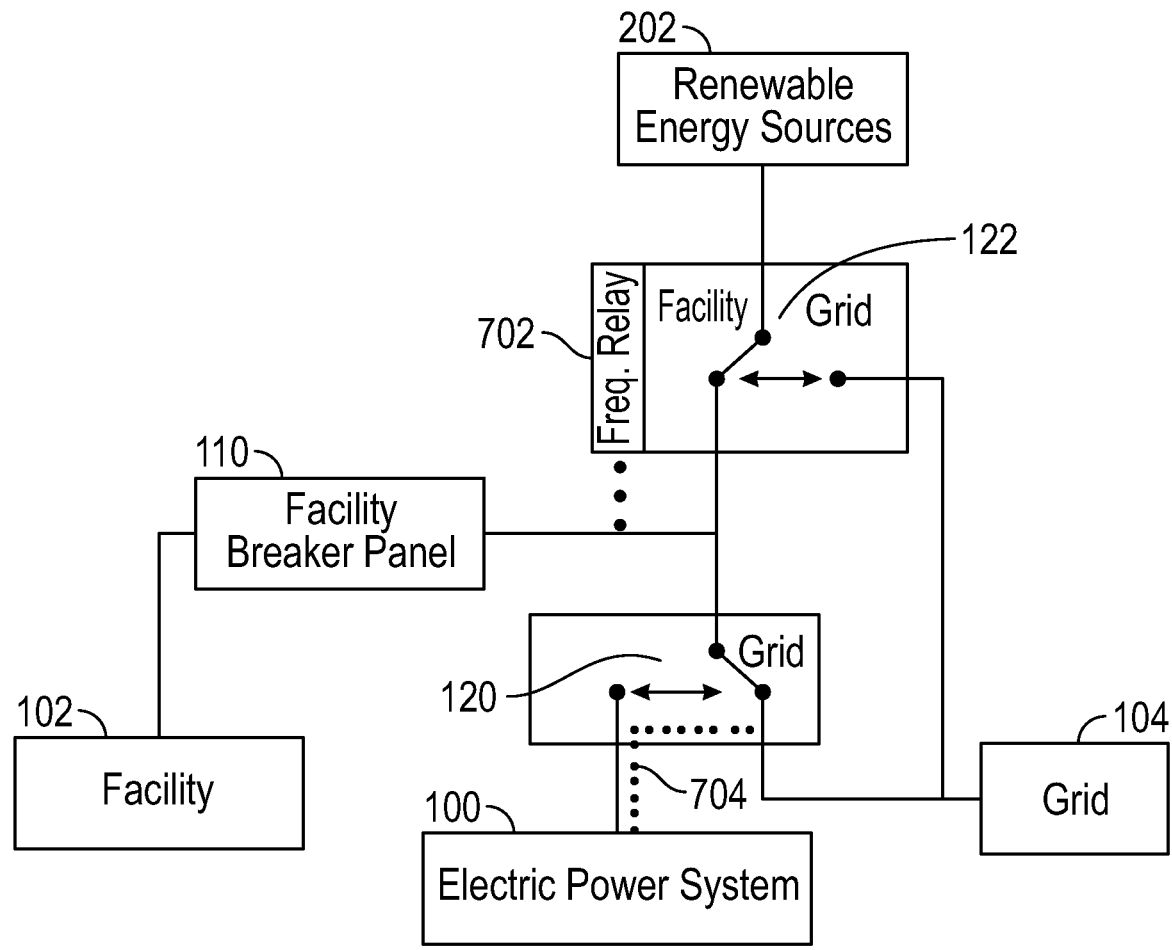

FIG. 7A-C are block diagrams illustrating examples of possible connection configurations between the electric load 102 and various energy sources, including the electric power system 100. In each configuration, the electric power system 100, electric load 102, renewable energy 202, and main grid 104 may be selectably connected via the load transfer switch 120 and renewable energy transfer switch 122.

FIG. 7A illustrates an off-grid configuration. In this configuration, both the load 102 and renewable energy 202 are connected to the electric power system 100. This configuration may occur when the storage pack 132 needs to charge or when the power demands of the load 102 exceed what the renewable energy 202 is configured to deliver. The system inverter 146 may output grid frequency AC power to the load 102 via the load transfer switch 120. It will be appreciated that the grid frequency may vary depending on the standard applicable to that grid. For example, the grid frequency may be 60 Hz when the system inverter 146 is connected to a grid operating according to typical power standards in the United States.

With continued reference to FIG. 7A, a frequency relay 702 may detect the AC power frequency, and since the renewable energy 202 may synchronize with the grid frequency per energy regulations, the frequency relay 702 may throw the renewable energy transfer switch 122 such that the outputted power flows to the load 102. The renewable energy sources 202 may then synchronize to the waveform established by the system inverter 146. Thus, the power generated by renewable energy 202 may flow to the load 102 and any excess power may be reverse fed into the system storage pack 132. If the renewable energy 202 is not sufficient to meet the needs of the load 102, the system inverter 146 may supplement with energy from the storage pack 132 to send to the load 102.

FIG. 7B illustrates an alternative off-grid configuration. In this configuration, the load 102 is connected to the system 100, but the renewable energy 202 is connected to the grid 104. This configuration may occur when the storage pack 132 is fully charged. The system inverter 146 may output micro-grid frequency AC power to the load 102 via the load transfer switch 120. It will be appreciated that the micro-grid frequency is preferably different from the grid frequency. For example, where the grid frequency is 60 Hz, the micro-grid frequency may differ by 1 or more Hz, 2 or more Hz, or 3 or more Hz. In one example, the grid frequency may be 60 Hz and the micro-grid frequency may be 62.5 Hz.

The frequency relay 702 may detect the AC power frequency, and since the micro-grid frequency is outside of the allowable frequencies at which a compliant grid-tied inverter is allowed to put power onto its associated power grid, the frequency relay 702 may throw the renewable energy transfer switch 122 such that the outputted power flows to the grid 104. The renewable energy sources 202 may then synchronize to the waveform of the grid 104. Thus, the power generated by renewable energy 202 may flow to the grid 104 and be sold back to the energy company for energy savings. If the system 100 requires charging, the system 100 may change its micro-grid frequency to grid frequency, which may cause the frequency relay 702 to throw the renewable energy transfer switch 122 to connect to load 102. This new configuration is the off-grid configuration described in FIG. 7A.

In some implementations, even when a load is not directly connected to a grid to directly use electricity from the grid, users may still utilize grid power through the electric power system 100, which may be connected to the grid. The system 100 may include a battery charger line 704 which allows the batteries 134 to draw power from the grid 104. The system 100 may determine when to pull energy from the grid 104. For example, the renewable energy source 202 and system 100 may provide enough power to meet load energy demands but not enough power to save excess charge in the battery 134. As such, the system battery 134 could deplete over time. To prevent such depletion, power from the battery charge line 704 may be accessed to allow charging with grid power. In some implementations, the system may determine that the batteries 134 should only be charged at night, when the cost of using electricity from the grid is cheaper. Users can thus access grid energy without putting the load's entire energy burden on the grid.

FIG. 7C illustrates a configuration in which the electric power system 100 is offline. This configuration occurs when the user does not have the electric power system 100 or has disconnected the electric power system 100. The grid 104 delivers power to the load 102 at grid frequency. The frequency relay 702, upon detecting the grid frequency, may throw the renewably energy transfer switch 122 to connect the renewable energy 202 with the load 102. The renewable energy sources 202 may then synchronize with the grid frequency. The renewable energy 202 thus powers the load 102 and any excess power generated is sold back to the grid 104. If renewable energy 202 is not enough, the power may be supplemented by grid power.

Example Electric Power System Heat Exchange Configuration

Figure 8:
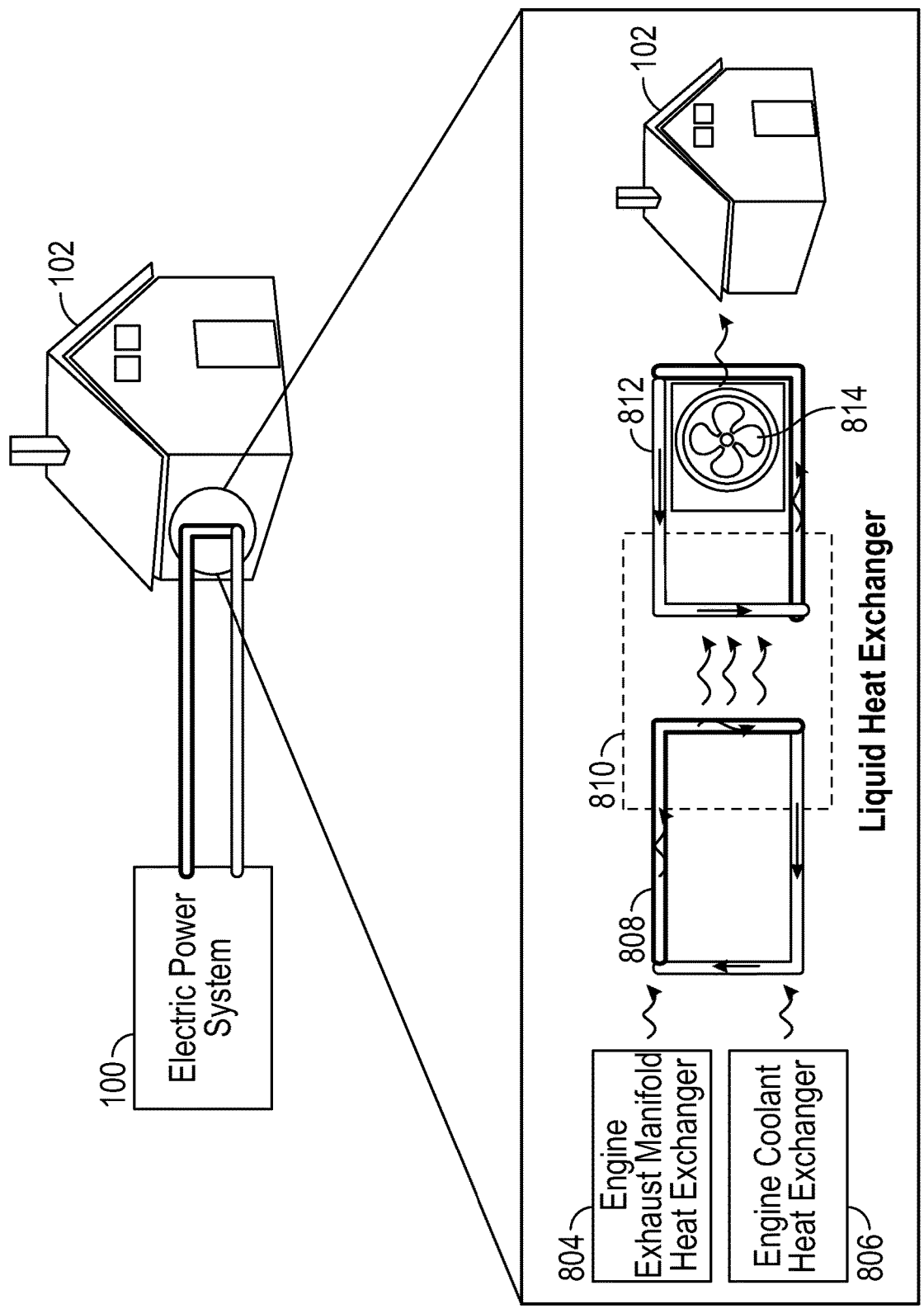
FIG. 8 is a block diagram of an example of an illustrative heat exchange circuit between an electric power system and an electric load.

FIG. 8 is a schematic diagram of a heat exchange circuit between the electric power system 100 and an electric load 102. The heat exchange circuit may harness the waste heat from the engine 160, battery pack 134, and system inverter 146 and use this heat to heat a home or facility. When the generator assembly 154 is operational, the heat byproduct may be captured by an engine exhaust manifold heat exchanger 804 and an engine coolant heat exchanger 806. The heat exchangers may transfer heat from the electric power system assembly 1100 (see FIGS. 11A and 11B) to the power system loop 808. The heated liquid may circulate through the power system loop 808 to the liquid heat exchanger 810, where heat from the power system loop 808 may then be transferred to the home loop 812. The cooled liquid may then circulate back toward the system assembly 1100 to be heated once again. Conversely, the liquid in the home loop 812 arrives at the liquid heat exchanger 810 cool and recirculates toward the house warmed by the heat from the power system loop 808. The heat absorbed by the home loop 812 may be directed to a radiator 814 or hot water tank 904 (see FIG. 9).

In some implementations, the times in which the back-up generator is needed corresponds to the times that there is a need for domestic heating. For example, cold cloudy days and nights when power from a solar array is not available are times that it is more likely a back-up generator would need to run. This also corresponds to the more likely times that there would be a need for domestic heat, some of which could be provided by the operation of the generator assembly 154.

Figure 9:
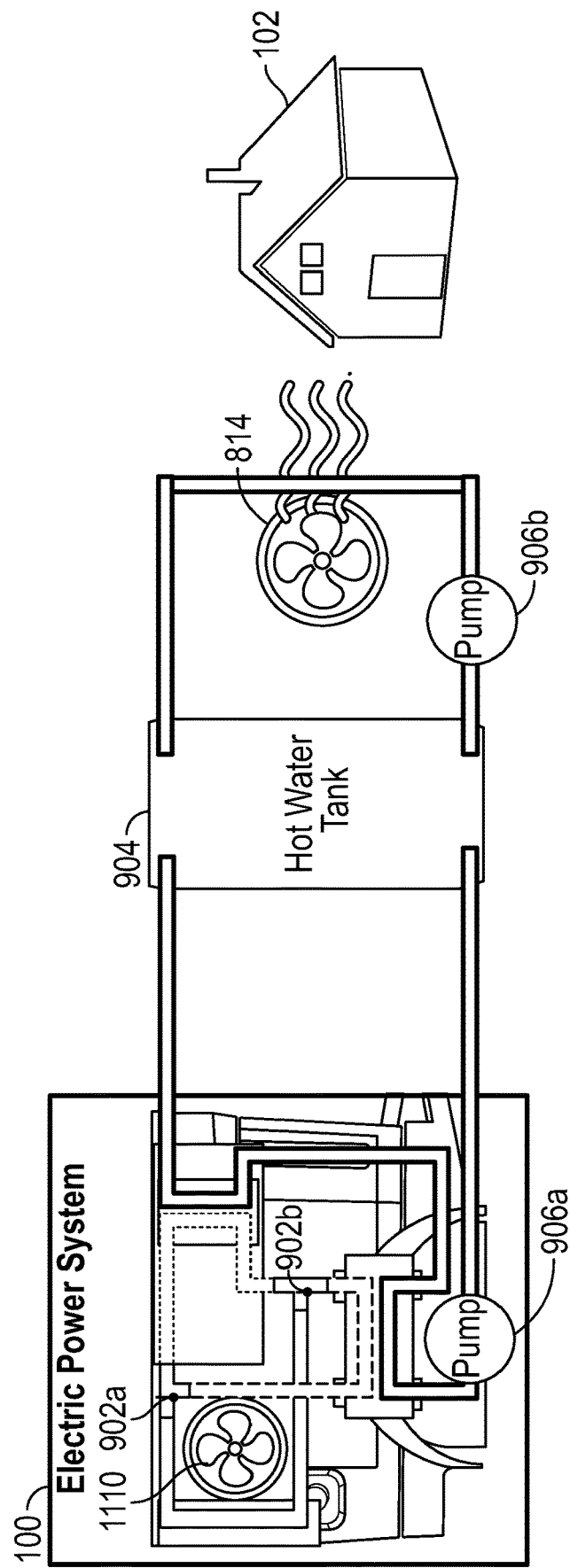
FIG. 9 is a block diagram illustrating heat flow between an electric power system and an electric load.

FIG. 9 is a schematic diagram illustrating an example heat flow between an electric power system and an electric load. The cooling and exhaust system in the electric power system assembly 1100 may include heat recovery devices for recovering the heat from the engine coolant, the exhaust manifold, the exhaust system, and the exhaust gases. This recovered waste heat may be utilized on-site to provide or supplement normal on-site heating requirements. For example, in a case where the system is being used at a home, this heat may be transferred to a heat storage tank such as a domestic hot water storage tank 904 for providing domestic hot water or to a radiator 814 for providing domestic space heating. The liquid from the system assembly 1100 may be circulated around the power system loop 808 by a pump 906a. The liquid from the home may be circulated around the home loop 814 by a pump 906b.

Figure 11A:
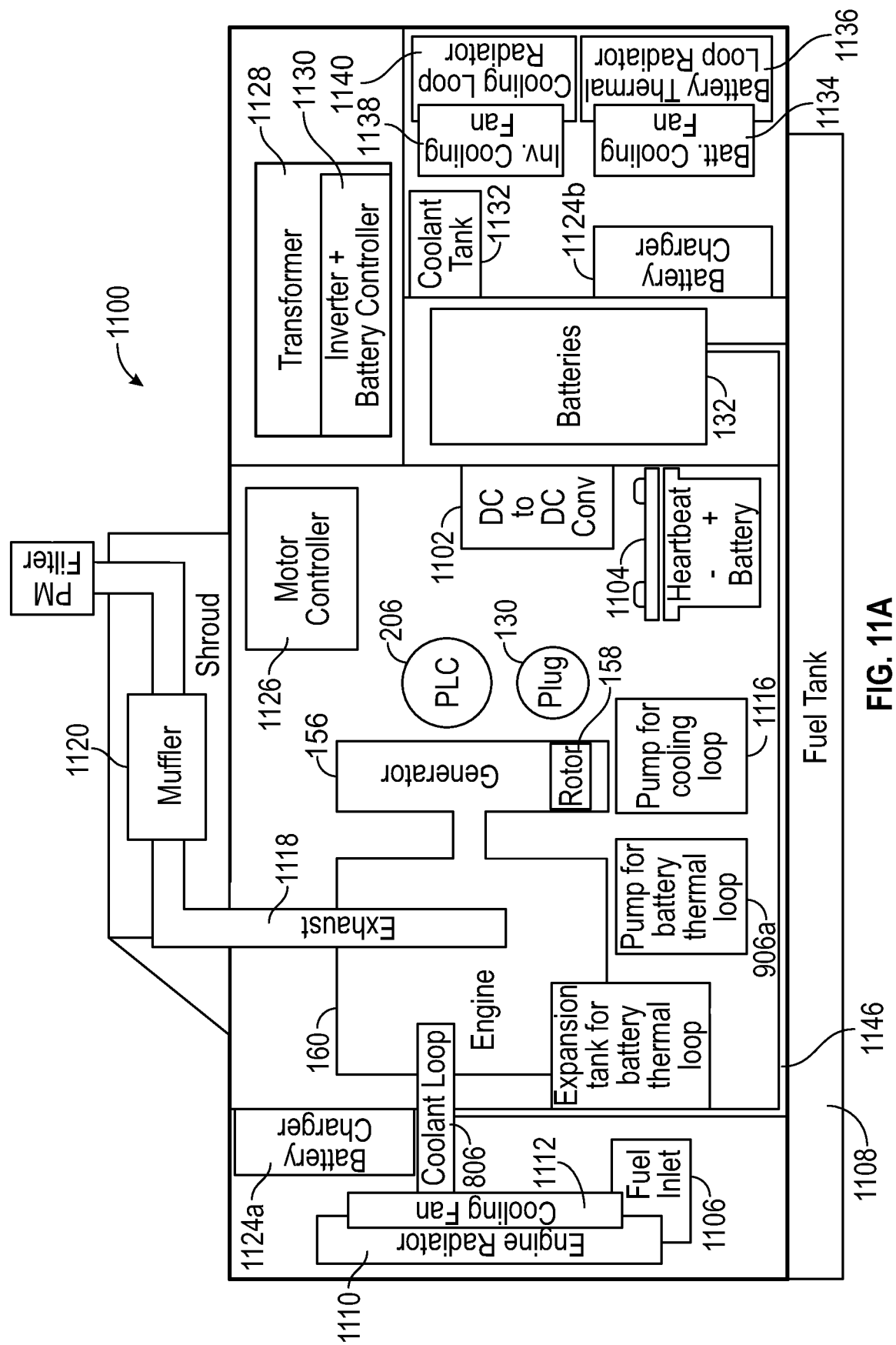
FIG. 11A is a schematic diagram of an example of a side plan view of an illustrative electric power system assembly.

The electric power system assembly 1100 may further include an engine radiator 1110 (FIG. 11A). The radiator 1110 may provide an alternate channel for engine heat dissipation when the house no longer requires heating. The system 100 may thus continue generating power for the house without risk of overheating. The radiator 1110 may remain off while the house draws in heat from the system assembly 1100 and may only turn on when the engine waste heat is no longer being used to heat the house.

The waste heat may also be used to heat the battery pack 134 of the system 100 in cold weather situations. Switches 902a and 902b in the system assembly 1100 may be controlled by the logic controller 206 to redirect heated liquid (and thus heat flow) to heat various components of the system assembly 1100 as well as the house. The switches 902a and 902b, or additional switches, may be configured to also switch a cooling system for the battery pack 134 from the thermal loop 906a to the coolant loop 806. The pack management control unit 140 (FIG. 1) may contain temperature sensors for each battery and may communicate the battery temperature information via CAN BUS to the logic controller 206. The logic controller 206 may automatically connect the battery pack 134 to the thermal loop 906a if the battery temperature falls below a predetermined threshold value and may automatically connect the battery pack 134 to the coolant loop 806 if the battery temperature exceeds a predetermined threshold value. The temperature thresholds may be manually overridden by the user in some implementations. The battery pack 134 may thus be maintained within a desired operating temperature range (for example, a temperature range that provides high operational efficiency).

It will be appreciated that switches 902a and 902b may be further configured to reroute heated liquid (coolant) such that the liquid flows through one or more heat exchangers. It will be appreciated that the number of heat exchangers through which liquid passes may be used to regulate the amount of heat exchanged with the coolant that provides heat to the hot water tank 904.

Example Electric Power System Construction

Figure 10:
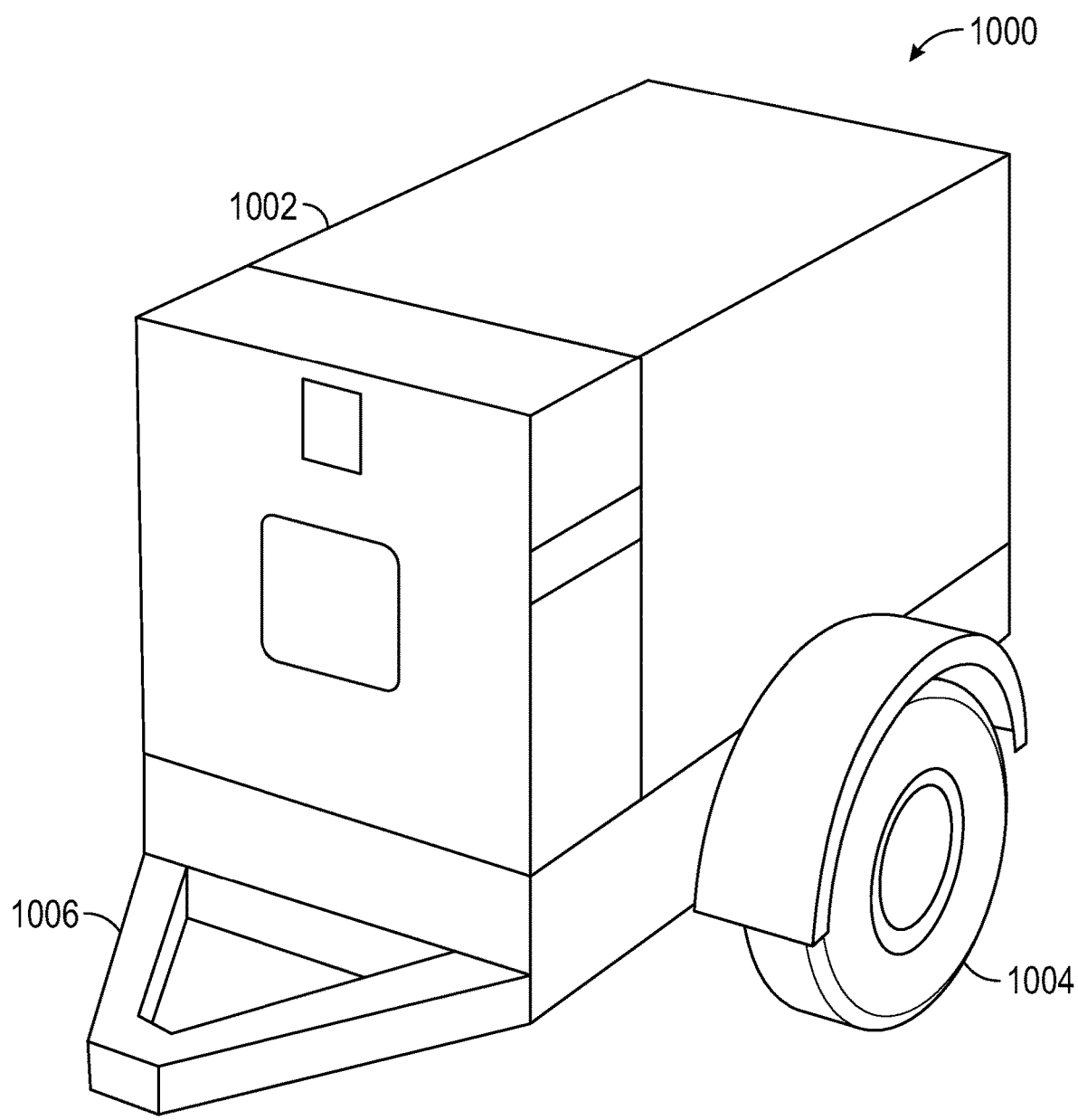
FIG. 10 shows an illustrative housing construction for the disclosed electric power system.

FIG. 10 is an illustrative housing construction 1000 for the electric power system 100. All the components described herein as part of electric power system 100 may be mounted inside the housing construction 1000 as an electric power system assembly 1100 (as further described herein), thereby providing an advantageously compact and portable system. The housing construction 1000 may include within it the rechargeable electric energy storage pack 132, system inverter 146, and generator assembly 154 (see, for example, FIG. 1). The housing construction 1000 may have a form factor similar to a utility trailer, such that the electric power system 100 may be easily transported behind an automobile. The trailer design may comprise an outer housing 1002, wheels 1004, and a towing hookup 1006. The outer housing 1002 of the housing construction 1000 may be any durable material suitable for extended use through various weather conditions. For example, the outer housing 1002 may be made of steel, aluminum, fiberglass, plastic, or vinyl. The outer housing 1002 may also comprise multiple layers, such that insulating material may be placed between the layers to reduce noise and/or deflect heat.

The housing construction 1000 may also be converted to a permanent setup. The wheels 1004 may be removed such that the entire housing construction 1000 may be mounted or otherwise secured to a stable surface. The towing hookup 1006 may lie on the same plane as the base of the outer housing 1002, and the towing hookup 1006 may lie flush against a mounting surface when the housing construction 1000 is secured. Alternatively, or in addition, the towing hookup 1006 may be removable, to provide a compact installation.

Figure 11B:
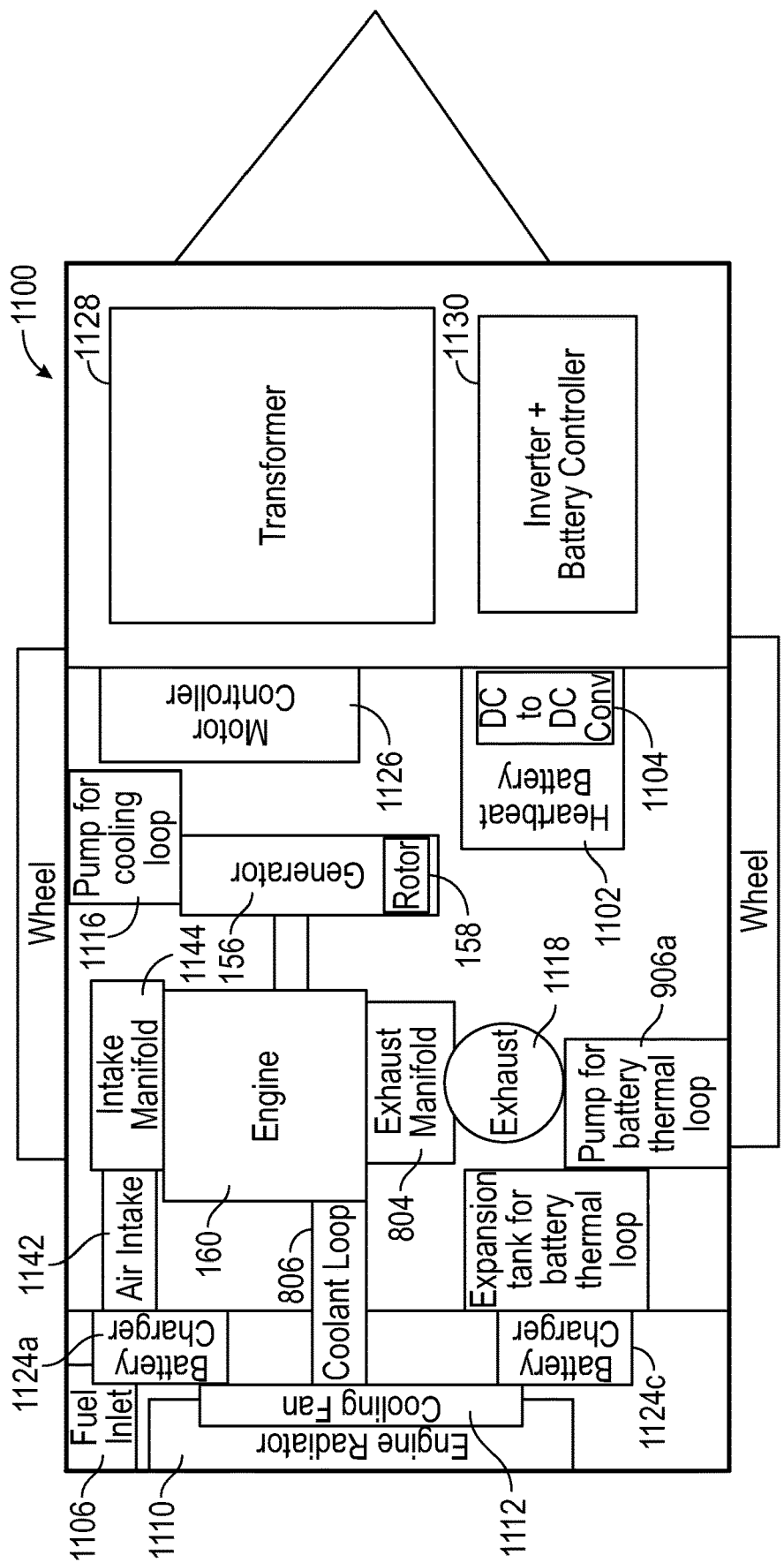
FIG. 11B is a block diagram of an example of a top-down plan view of an illustrative electric power system assembly.

FIGS. 11A and 11B show top and side plan views of an example of an electric power system assembly 1100. The electric power system assembly 1100 may fit entirely within the housing construction 1000. As described herein, the electric power system assembly 1100 may allow for quick and easy installation of the electric power system 100. The system may be installed at any site with existing grid-tied renewable energy 202 or other variable energy source by simply installing the herein described disconnect switches and an appropriately sized electrical receptacle 130 that may be electrically connected to the facility breaker panel 110.

FIG. 11A is a schematic diagram of an example of a side plan view of an illustrative electric power system assembly 1100. The electric power system assembly 1100 may contain a battery 1104 to power the system 100. The battery 1104 may be connected to a DC to DC converter 1102. The DC to DC converter draws power from the storage pack 132 and converts the voltage to a value compatible with the battery 1104.

The electric power system assembly 1100 may also have a programmable logic controller 206, as described in FIG. 2. The logic controller 206 may be a user interface from which the user may define charging protocol parameters. The logic controller 206 may also be linked to a user-friendly application (for example, on a portable, personal device such as a phone or tablet) or website through which users may remotely change settings on the electric power system 100 as well as monitor charging and energy use. As described herein, the logic controller 206 may communicate with other components of the electric power system 100 to control selection of which energy source (202, 160, or 104) (FIG. 2) provides electricity to charge the storage pack 132.

The engine exhaust 1118 and cooling systems may allow the electric power system 100 to operate at lower noise levels, as described herein. The engine exhaust 1118 and cooling systems may be configured to allow the engine 160 to be installed within an insulated enclosure to significantly reduce the noise levels associated with running the engine. An engine radiator 1110 and engine radiator fan 1112 may be provided external to the enclosure for cooling the engine. A muffler 1120 with a vibration dampening penetration through the enclosure along with vibration dampening mounts for the engine may be used to provide for even further noise reduction. Along with lower noise disturbance, the electric power system 100 also offers low air quality disturbance through the use of a particulate matter filter at the mouth of the engine exhaust 1118.

Heat-generating components in the electric power system assembly 1100, such as the generator 156, engine 160, system inverter 146, and storage pack 132, may have associated cooling systems. The high frequency generator 156 may be passively air-cooled or a liquid coolant loop 806 may be added to the high frequency generator 156 to better control the temperature of the machine. The high frequency generator 156 may be attached to the heat engine 160 with insulating materials between the connection points to reduce heat transfer from the heat engine 160 to the high frequency generator 156. The coolant in the coolant loop 806 may be stored in a coolant tank 1132 and circulated by a pump for the cooling loop 1116. The coolant in the coolant tank 1132 may also be used to cool other components of the power system assembly 1100, such as the inverter 146, the generator 156, the motor controller 1126, the DC-to-DC Converter 1102, and the storage pack 132. Alternatively, or in addition, the storage pack 132 may be connected to the coolant loop 806 via a pipeline 1146. As discussed herein, the storage pack 132 may most efficiently operate within a certain range of temperatures and, in some implementations, the temperature of that storage pack 132 may advantageously be modulated by controlling the flow of coolant from the coolant loop 806 to the storage pack 132 via the pipeline 1146, which may form a closed loop to bring the coolant back to the coolant loop 806. As described herein, the engine 160 may be cooled by an engine radiator 1110 and engine radiator fan 1112. The system inverter 146 may be cooled by an inverter cooling loop radiator 1140 and an inverter cooling loop radiator fan 1138, and the storage pack 132 may be cooled by a battery thermal loop radiator 1136 and a battery thermal loop radiator fan 1134. The battery thermal loop coolant may be circulated by a battery thermal loop pump 906a, just as the inverter cooling loop coolant may be circulated by an inverter cooling loop pump 1116.

As described herein, the cooling and exhaust system may include heat recovery devices for recovering the heat from the engine coolant, the exhaust manifold 804 (see FIG. 11B), the exhaust system, and the exhaust gases. This recovered waste heat may be utilized on-site to provide or supplement normal on-site heating requirements. For example, in a case where the system is being used at a home, the battery thermal loop may use waste heat away from the battery to a heat storage tank such as a domestic hot water storage tank for providing domestic hot water or may be used to provide or augment domestic space heating (such as for radiator-based heating systems). This waste heat may also be used to heat the storage pack of the system in cold weather situations, via a battery thermal loop, which may have advantages for increasing the efficiency of the storage pack.

A fuel tank 1108 may also be included to provide fuel to the engine 160. The fuel tank 1108 may be mounted within a frame that is designed to support the other components of the system. Fuel, such as diesel or gasoline, may be poured in from a fuel inlet 1106 attached to the fuel tank 1108.

FIG. 11B is a block diagram of an example of a top-down plan view of an illustrative electric power system assembly 1100. The electric power system assembly 1100 may contain one or more battery chargers (1124a, 1124b, 1124c). The battery charger may connect the power grid 104 to the storage pack 132. As described in FIG. 2, the battery charger (1124a, 1124b, 1124c) may receive CANs command from the logic controller 206 to begin or stop charging the storage pack 132 from the grid 104. The battery charger may also act as an AC to DC converter 204c, as noted in FIG. 2. Though the illustration shows three battery chargers, fewer or more battery chargers may be used.

The electric power system assembly 1100 may contain a motor controller 1126. The motor controller 1126 may connect the generator assembly 154 to the storage pack 132. As described in FIG. 2, the motor controller 1126 may receive CAN commands from the logic controller 206 to start or stop the engine 160, or to reduce or increase RPMs. The battery charger may also act as an AC to DC converter 204b, as noted in FIG. 2.

The electric power system assembly 1100 may contain an inverter and battery controller unit 1130. The unit 1130 may be one integrated device or may be separate components, as illustrated in FIG. 2. The unit 1130 may connect the renewable energy source 202 with the storage pack 132. As described in FIG. 2, the unit 1130 may receive CAN commands from the logic controller 206 to begin or stop charging the storage pack 132 with renewable energy. The unit 1130 may be connected to a transformer 1128, which converts the renewable energy AC power output to DC to charge the storage pack 132. Thus, the transformer 1128 may act as an AC to DC converter 204a, as noted in FIG. 2. The unit 1130 may be connected to a transformer 1128.

The electric power system assembly 1100 may also contain an intake manifold 1144 and exhaust manifold 804 for engine cooling. An air intake 1142 may feed into the intake manifold 1144. As described herein, the intake manifold 1144 and exhaust manifold 804 may be used to recover waste heat from within the assembly 1100 to repurpose as heating for a home or facility.

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual configuration (assuming that the functionalities of the depicted configurations are not adversely affected).

Features, materials, characteristics, or groups described in conjunction with a particular aspect, configuration, or example are to be understood to be applicable to any other aspect, configuration or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing implementations. The protection extends to any novel one, or any novel combination, of the features disclosed in this specification (including any accompanying claims, abstract and drawings), or to any novel one, or any novel combination, of the steps of any method or process so disclosed.

While certain implementations have been described, these implementations have been presented by way of example only and are not intended to limit the scope of protection. Indeed, the novel methods and systems described herein may be embodied in a variety of other forms. Furthermore, various omissions, substitutions and changes in the form of the methods and systems described herein may be made. It should be understood that steps within a method may be executed in different order without altering the principles of the disclosure. Those skilled in the art will appreciate that in some implementations, the actual steps taken in the processes illustrated or disclosed may differ from those shown in the figures. Depending on the configuration, certain of the steps described above may be removed, others may be added. For example, the actual steps or order of steps taken in the disclosed processes may differ from those shown in the figures. For instance, the various components illustrated in the figures may be implemented as software or firmware on a processor, controller, ASIC, FPGA, or dedicated hardware. Hardware components, such as processors, ASICs, FPGAs, and the like, may include logic circuitry. Furthermore, the features and attributes of the specific implementations disclosed above may be combined in different ways to form additional implementations, all of which fall within the scope of the present disclosure.

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

The term "and/or" herein has its broadest least limiting meaning which is the disclosure includes A alone, B alone, both A and B together, or A or B alternatively, but does not require both A and B or require one of A or one of B. As used herein, the phrase "at least one of" A, B, "and" C should be construed to mean a logical A or B or C, using a non-exclusive logical or.

Conditional language, such as "can," "could," "might," or "may," unless specifically stated otherwise, or otherwise understood within the context as used, is generally intended to convey that certain implementations include, while other implementations do not include, certain features, elements, or steps. Thus, such conditional language is not generally intended to imply that features, elements, or steps are in any way required for one or more implementations or that one or more implementations necessarily include logic for deciding, with or without user input or prompting, whether these features, elements, or steps are included or are to be performed in any particular configuration. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, may mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain implementations require the presence of at least one of X, at least one of Y, and at least one of Z.

The scope of the present disclosure is not intended to be limited by the specific disclosures of preferred implementations in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An electric power system for managing and storing electric power and providing uninterrupted electric power from a plurality of electric power sources to an electric load connected to the electric power system, the plurality of electric power sources including a variable energy source that is variable over time and that is configured to generate an AC power output from the variable energy source at an output voltage and frequency, the variable energy source further configured to detect an AC operating frequency associated with the electric power system and to synchronize the AC power output frequency of the AC power output arrangement of the variable energy source to the detected AC operating frequency, the electric power system comprising:
   a rechargeable electric energy storage pack comprising a storage pack DC power input/output;
   an inverter electrically connected to the rechargeable electric energy storage pack, the inverter comprising:
      a voltage converter for changing a voltage of electrical power input to, and/or output from, the inverter,
      an inverter DC power input/output for receiving and transmitting DC electric power to and from the rechargeable electric energy storage pack, the inverter DC power input/output electrically connected to the storage pack DC power input/output, and
      an AC power input/output for electrically connecting the inverter to the AC power output of the variable energy source, the inverter configured to generate a desired AC operating frequency and voltage using DC power supplied by the rechargeable electric energy storage pack and to electrically communicate the generated AC operating frequency and voltage to the variable energy source through the AC power input/output; and
   a fuel-powered generator assembly including:
      a high frequency generator for generating an electric power output,
      a heat engine connected to the high frequency generator for driving the high frequency generator, and
      an active rectifier for rectifying the electric power output of the high frequency generator to produce a DC power output for the generator assembly, wherein the DC power output of the generator assembly is electrically connected to the storage pack DC power input/output;
   wherein the AC input/outputs of the inverter are configured to provide electrical power to the electric load.

2. The electric power system of claim 1, wherein the storage pack DC power input/output comprise common terminals for input and output.

3. The electric power system of claim 1, wherein the inverter DC power input/output comprise common terminals for input and output.

4. The electric power system of claim 1, wherein the high frequency generator comprises a permanent magnet rotor.

5. The electric power system of claim 4, wherein the high frequency generator comprises an integrated starter alternator.

6. The electric power system of claim 4, wherein the rotor functions as a flywheel for the heat engine.

7. The electric power system of claim 1, wherein the rectifier is part of a generator controller electrically connected to the high frequency generator and configured to control the operation of the high frequency generator.

8. The electric power system of claim 1, wherein the variable energy source comprises at least one of: a photoelectric solar panel array, a wind turbine, or a water turbine.

9. The electric power system of claim 1, further comprising:
   a liquid cooling loop for cooling the heat engine; and
   a heat exchanger configured to interface with and to transfer heat to a liquid heat exchange loop in fluid communication with premises containing the electric load.

10. An electric power system, comprising:
    an electric battery;
    a fuel-powered generator for generating alternating current electricity;
    an active rectifier in electrical communication with the fuel-powered generator and the electric battery, the active rectifier configured to:
       receive the alternating current electricity from the fuel-powered generator;
       provide active rectification of the alternating current electricity; and
       output direct current electricity to the electric battery; and
    an inverter comprising:
       an input in electrical communication with the electric battery;
       an output for electrical communication with a load; and
       a heat engine connected to a high frequency generator.

11. The electric power system of claim 10, wherein the fuel-powered generator is configured to generate alternating current electricity having a frequency of 400 Hz or more.

12. The electric power system of claim 10, further comprising a controller configured to vary a spin rate of the fuel-powered generator depending on a time of day, wherein the spin rate varies based on allowable noise level thresholds associated with the time of the day.

13. An electric power system, comprising:
    an electric battery;
    a fuel-powered generator for generating alternating current electricity;
    an active rectifier in electrical communication with the fuel-powered generator and the electric battery, the active rectifier configured to:
       receive the alternating current electricity from the fuel-powered generator;
       provide active rectification of the alternating current electricity; and
       output direct current electricity to the electric battery; and
    an inverter comprising:
       an input in electrical communication with the electric battery; and
       an output for electrical communication with a load; a liquid cooling loop for cooling the fuel-powered generator; and a heat exchanger configured to interface with and to transfer heat from the liquid cooling loop to a liquid heat exchange loop in fluid communication with premises containing the electric load.

14. The electric power system of claim 13, further comprising:
    a secondary heat exchanger configured to interface with and to transfer heat from the liquid cooling loop to the liquid heat exchange loop; and
    a pair of switchable fluid flow controllers configured to divert liquid from the liquid cooling loop to the secondary heat exchanger.

* * * * *